US009671038B2

(12) United States Patent
Schneidewend

(10) Patent No.: US 9,671,038 B2
(45) Date of Patent: Jun. 6, 2017

(54) PILOT VALVE WITH MECHANICAL VALVE ACTUATOR

(71) Applicant: Tedd Michael Schneidewend, Milwaukee, WI (US)

(72) Inventor: Tedd Michael Schneidewend, Milwaukee, WI (US)

(73) Assignee: Pentair Residential Filtration, LLC, Glendale, WI (US)

( * ) Notice: Subject to any disclaimer, the term of this patent is extended or adjusted under 35 U.S.C. 154(b) by 110 days.

(21) Appl. No.: 14/205,178

(22) Filed: Mar. 11, 2014

(65) Prior Publication Data

US 2014/0251463 A1 Sep. 11, 2014

Related U.S. Application Data

(60) Provisional application No. 61/776,562, filed on Mar. 11, 2013.

(51) Int. Cl.
*F16K 31/00* (2006.01)
*F16K 31/385* (2006.01)
(Continued)

(52) U.S. Cl.
CPC .......... *F16K 31/3855* (2013.01); *F16K 1/443* (2013.01); *G05D 16/163* (2013.01); *Y10T 137/7922* (2015.04)

(58) Field of Classification Search
CPC ......... G05D 16/163; F16K 1/00; F16K 17/00; F16K 31/3855; F16K 1/443; Y10T 137/7922

(Continued)

(56) References Cited

U.S. PATENT DOCUMENTS 1,864,402 A * 6/1932 Bodemuller ............ F16K 31/34
137/398
2,180,320 A * 11/1939 Hansen .................. F16K 31/385
137/635

(Continued)

FOREIGN PATENT DOCUMENTS

WO 2010077472 A2 7/2010
WO 2011149717 A1 12/2011

OTHER PUBLICATIONS

Dorot, 300 Series Automatic Hydraulic Control Valves Brochure, 80 pages, 2002.

(Continued)

*Primary Examiner* — Umashankar Venkatesan
(74) *Attorney, Agent, or Firm* — Quarles & Brady LLP

(57) ABSTRACT

Embodiments of the invention provide a normally open valve, a normally closed valve, and a combination valve. The valves include a valve body with an inlet coupled to a fluid supply line, an outlet providing a service flow of fluid, a vent venting to atmosphere, a lower piston, a lower diaphragm, and a mechanical valve actuator. The mechanical valve actuator includes an upper piston, an upper diaphragm, a pilot piston with a bore and a plunger, and a spring. The spring is positioned either inside the pilot piston for the normally open valve or inside the upper piston for the normally closed valve. The valves are actuated based on a control fluid entering a system pressure port and exceeding a pressure set point in order to either open or close the valve.

20 Claims, 15 Drawing Sheets

(51) Int. Cl.
*G05D 16/16* (2006.01)
*F16K 1/44* (2006.01)

(58) Field of Classification Search
USPC .......................................... 251/25, 28, 29, 31
See application file for complete search history.

(56) References Cited

U.S. PATENT DOCUMENTS

| | | | |
|---|---|---|---|
| 3,587,601 A | | 6/1971 | Shippy |
| 3,689,025 A | * | 9/1972 | Kiser .................. F16K 7/16 |
| | | | 137/906 |
| 4,320,777 A | | 3/1982 | Tomlin et al. |
| 4,331,315 A | | 5/1982 | Geisow |
| 4,340,088 A | | 7/1982 | Geisow |
| 4,385,746 A | | 5/1983 | Tomlin et al. |
| 4,390,171 A | | 6/1983 | Geisow |
| 4,470,319 A | | 9/1984 | Blackwell et al. |
| 4,512,359 A | | 4/1985 | Hinojosa et al. |
| 4,535,805 A | | 8/1985 | Mertz |
| 4,586,534 A | | 5/1986 | McNeely |
| 4,665,946 A | | 5/1987 | Hulsey |
| 4,712,812 A | * | 12/1987 | Weir, III ................ F16L 25/14 |
| | | | 138/96 T |
| 5,005,805 A | | 4/1991 | Morris et al. |
| 5,163,655 A | | 11/1992 | Chickering, III et al. |
| 5,758,863 A | * | 6/1998 | Buffet ................ F16K 31/3855 |
| | | | 251/28 |
| 5,829,473 A | | 11/1998 | Hajbi et al. |
| 6,092,550 A | | 7/2000 | Gotch et al. |
| 6,612,335 B1 | | 9/2003 | Assa et al. |
| 6,968,857 B2 | | 11/2005 | Hawkins et al. |
| 2008/0087038 A1 | | 4/2008 | Nicolaisen et al. |

OTHER PUBLICATIONS

Emerson Process Management, Daniel Power Cylinder Operated Valves Brochure, 8 pages, May 2001.
Emerson Process Management, Daniel Liquid Control Valves Technical Guide, 52 pages, Feb. 2008.
Watts ACV, Classic Series ES-F116 Pressure Relief, Sustaining, or Backpressure Control Valve Brochure 1 page, 2005.
Watts ACV, Classic Series Standard Materials Bulletin 2 pages, 2005.
Watts ACV, Classic Series IS-F116 Pressure Relief, Sustaining, or Backpressure Control Valve Brochure, 2 pages, 2005.
Watts ACV, Classic Series F116 Pressure Relief, Sustaining, or Backpressure Control ValveSchematic, 1 page, 2005.

* cited by examiner

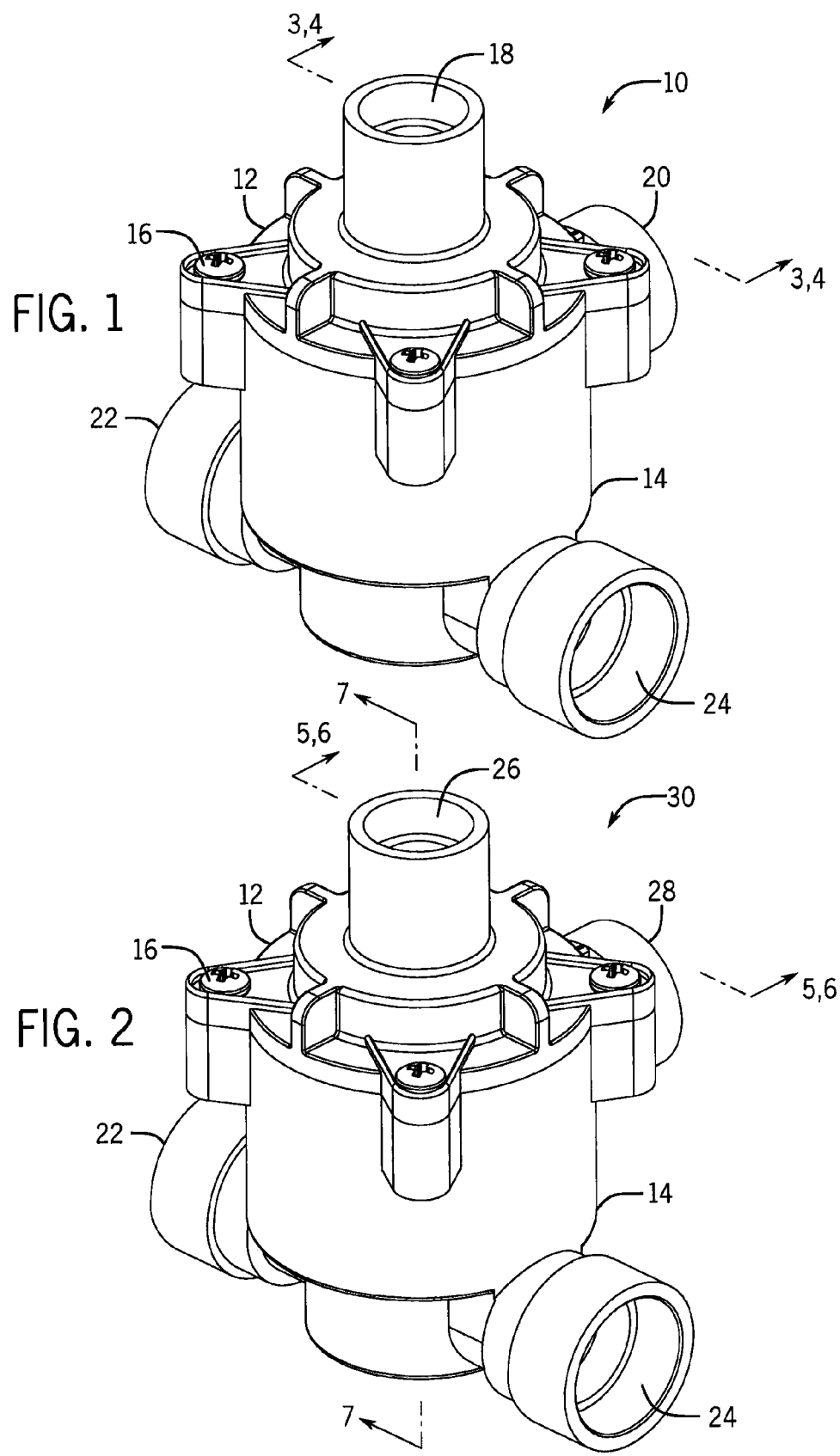

PILOT VALVE WITH MECHANICAL VALVE ACTUATOR

CROSS REFERENCE TO RELATED APPLICATIONS

This application claims the benefit of U.S. Provisional Patent Application No. 61/776,562 filed on Mar. 11, 2013, the entire contents of which are incorporated herein by reference.

BACKGROUND

Conventional control valves used in low pressure fluid systems are not ideal when actuation of the valve requires a minimum pressure drop, or for applications where the fluid stream cannot be used as the medium. Many control valves are actuated based on a pressure differential that causes the valve to close above a pressure set point and open below the same pressure set point. Thus, valve actuation based on a pressure point differential typically does not allow for consistent operation across a wide range of operating pressures of the system, which may occur in water filtration systems during installations, or through applications with limited and/or no power. In addition, most differential pressure valves or direct acting valves use a sealing mechanism attached to a piston within the valve to actuate the valve. Therefore, valves actuated by differential pressure, rather than actuation from a pressure that changes from high to low, require larger valve sizes, which can be less economical.

Many control valves also require use of external components disposed outside of a valve housing, such a solenoid valve having an external electrical connection. A solenoid is necessary to move a plunger, which creates a small opening and causes pressure through the opening to actuate the valve seal. Solenoid valves typically require a constant flow of electrical current to remain open because the electromagnetic field dissipates and the valve returns to its original or closed position once the current is stopped. Other control valves, such as check valves, pressure relief valves, and needle valves, also require external components to operate, causing increases in manufacturing costs. Further, many conventional pressure relief valves do not operate within a single contained housing. For example, pressure relief valves typically use other external components to operate, and may operate externally from the valve itself. As a result, the valve often needs to be adjusted depending on different operating pressures required by the system. Many control valves also include multiple chambers that need to be pressurized separately, thereby increasing system setup times. In addition, many control valves require electrical power to actuate the valve and, therefore, do not function using system-based parameters, such as pressure, which can change with the manual opening and closing of the system, thus creating higher operational costs. Lastly, conventional control valves typically allow backflow of the system fluid when in the closed position, which can cause damage to membranes in the system, if present.

One known system discloses a hydraulic control valve comprising a housing fitted with an inlet port, an outlet port, and a sealing port that divides the housing into an inlet chamber and an outlet chamber. A stem is connected to a diaphragm and is axially displaced within the housing. The diaphragm separates the housing into a first control chamber and a second control chamber. A control port is connected to the first control chamber and a hydraulic or pneumatic control signal is introduced by a controller to the control port to close the valve. The hydraulic or pneumatic control signal is in communication with a power source, which generates an applied force to a rigid disc mounted to the top surface of the diaphragm, thereby closing the valve.

Another system discloses a valve mechanism including a valve body and bonnet structure defining a tapered valve chamber that receives a tapered plug member that is operated by linear and rotary components of movement to achieve valve operation. An external component provided in the form of an externally adjustable plug is provided by the valve mechanism to enable the position of the plug element to be adjusted relative to the inlet and outlet flow passages defined by the valve body. A predetermined pressure differential across the sealing elements of the valve is required to compensate for volumetric changes as the valve element is seated and unseated.

Another system provides a check valve mechanism including a valve body and valve seat assembly having noncircular, eccentrically located hinge pin receptacles. Hinge pins are supported in the receptacles that support a check valve disc in such a manner that both opening and closing movements have components of rotary and linear disc movement relative to the hinge pin and valve seat. As the pressure differential across the disc member increases, the disc member moves linearly to open and close the valve. In addition, if the hinge pins are not in engagement with the receptacles, reverse flow of the system fluid is allowed.

Therefore, it would be desirable to provide a system and method that addresses one or more of the needs described above. More particularly, it would be desirable to provide a valve system that does not use external components to operate, like the construction of many existing check valves, pressure relief valves, and needle valves, for example. Rather, a valve that operates without the influence of external components is desirable. It would also be desirable to provide a valve system that uses a pressure set point, as opposed to a differential pressure, to open and close the valve. A valve that needs only one of the valve chambers to be pressurized, while still being able to operate in a consistent fashion regardless of the system pressure level, is also desirable. Finally, it would also be desirable to provide a valve that mechanically functions (i.e., requires no power) with the manual operation of the system (e.g., opening and closing of a faucet) and does not allow backflow of the system fluid when the valve is in the closed position.

SUMMARY

For system installations or applications with limited or no access to a power source, a fully mechanical valve is desirable. Some embodiments of the disclosure provide a valve that is normally open. The valve is adapted to be coupled to a fluid supply line. The valve provides a service flow of fluid and is designed to receive a control fluid. The valve is in fluid communication with the atmosphere. The valve includes a valve body having an inlet coupled to the fluid supply line, an outlet providing the service flow of fluid, and a vent venting to the atmosphere. The valve further includes a lower piston, a lower diaphragm, and a mechanical valve actuator. The mechanical valve actuator includes an upper piston, an upper diaphragm, a pilot piston with a bore and a plunger, and a spring. The upper diaphragm is coupled to the upper piston and the pilot piston. The spring is positioned inside the bore of the pilot piston and is configured to move axially between the lower diaphragm and the upper diaphragm. The valve body includes a restriction wall positioned between the inlet and the outlet. The restriction wall defines a passageway for the service flow of fluid. A pilot extends through the lower piston and the lower diaphragm. A bonnet is coupled to the valve body and includes a system pressure port coupled to a control line. When a pressure in the control line exceeds a pressure set point, the upper piston moves downwardly, the plunger of the pilot piston partially or fully obstructs the pilot, and the lower piston causes the lower diaphragm to engage the restriction wall so that the lower diaphragm blocks the passageway for the service flow of fluid in order to close the valve.

The pressure set point is determined by a strength of the spring. In one embodiment, the pressure set point is 69 kPa. The normally open valve includes a bleed opening extending through the lower piston and the lower diaphragm in the valve body. The bleed opening is configured to vent the fluid flow at the inlet. The bleed opening is also configured to vent excess service flow to a lower chamber when the valve is closed. In some embodiments, the valve body includes an upper chamber, a middle chamber, and a lower chamber. The upper chamber is positioned between the upper diaphragm and the system pressure port, and the lower chamber positioned between the middle chamber and the lower diaphragm. The control fluid is provided to the valve through the system pressure port. In one embodiment, the control fluid enters the system pressure port to actuate the valve without the use of electrical power. The control fluid is confined to the upper chamber and maintained separate from the service flow of fluid between the inlet and the outlet.

In one embodiment, the plunger partially or fully obstructs the pilot and prohibits backflow of the service flow of fluid when the normally open valve is closed. The pilot includes a first passageway with a first diameter that extends through the lower piston. The pilot also includes a second passageway with a second diameter that extends through the lower diaphragm. In one embodiment, the first diameter of the first passageway is smaller than the second diameter of the second passageway. At least one of the inlet, the outlet, the vent, and the system pressure port include a passageway with a plurality of radially concentric diameters.

In another embodiment, a valve that is normally closed is provided. In the normally closed valve, the spring is positioned inside the upper piston and configured to move axially within the upper piston. When a pressure in the control line exceeds a pressure set point, the pilot piston moves upwardly and the plunger of the pilot piston partially or fully uncovers the pilot. The lower piston moves upwardly causing the lower diaphragm to disengage from the restriction wall so that the passageway for the service flow of fluid is no longer blocked in order to open the valve.

The pressure set point is determined by a strength of the spring. In one embodiment, the pressure set point is 69 kPa. The normally closed valve includes a bleed opening extending through the lower piston and the lower diaphragm in the valve body. The bleed opening is configured to vent the fluid flow at the inlet. The bleed opening is also configured to vent excess service flow to a lower chamber when the valve is closed. In some embodiments, the valve body includes an upper chamber, a middle chamber, and a lower chamber. The upper chamber is positioned between the upper diaphragm and the outlet port, and the lower chamber is positioned between the middle chamber and the lower diaphragm. The control fluid is provided to the valve through the system pressure port. In one embodiment, the control fluid enters the system pressure port to actuate the valve without the use of electrical power. The control fluid is confined to the middle chamber and maintained separate from the service flow of fluid between the inlet and the outlet.

In one embodiment, the plunger partially or fully obstructs the pilot and prohibits backflow of the service flow of fluid when the normally closed valve is closed. The pilot includes a first passageway with a first diameter and extends through the lower piston. The pilot also includes a second passageway with a second diameter and extends through the lower diaphragm. In one embodiment, the first diameter of the first passageway is smaller than the second diameter of the second passageway. At least one of the inlet, the outlet, the outlet port, and the system pressure port include a passageway with a plurality of radially concentric diameters.

In a further embodiment, a combination valve is provided which includes a normally open valve portion and a normally closed valve portion. The combination valve is adapted to be coupled to a fluid supply line. The valve provides a service flow of fluid and receives a control fluid while in communication with the atmosphere. The combination valve includes a valve body that includes an inlet coupled to the fluid supply line, an outlet providing the service flow of fluid, a vent venting to the atmosphere, and a system pressure port adapted to be coupled to a second control line. A first pressure in a first control line exceeds a pressure set point and causes a first upper piston to move downwardly and a first plunger of a first pilot piston to partially or fully obstruct a first pilot. Then, a first lower piston causes a first lower diaphragm to engage a first restriction wall so that the first lower diaphragm blocks a passageway for the service flow of fluid in order to close the normally open valve portion. A second pressure in the second control line exceeds the pressure set point and causes a second pilot piston to move upwardly and a second plunger of the second pilot piston partially or fully uncovers a second pilot. Then, a second lower piston moves upwardly causing a second lower diaphragm to disengage from a second restriction wall so that the passageway for the service flow of fluid is no longer blocked in order to open the normally closed valve portion.

In one embodiment, the combination valve further includes a first mechanical valve actuator and a second mechanical valve actuator. The first mechanical valve actuator includes a first upper piston, a first upper diaphragm, a first spring, and a first pilot piston. The first pilot piston includes a first plunger, which is surrounded by a first bore. The second mechanical valve actuator includes a second upper piston, a second upper diaphragm, a second spring, and a second pilot piston. The second pilot piston includes a second plunger, which is surrounded by a second bore. In some embodiments, the first upper diaphragm is coupled to the first upper piston and the first pilot piston, and the second upper diaphragm is coupled to the second upper piston and the second pilot piston. The first pilot piston extends through the first lower piston and the first lower diaphragm. Similarly, the second pilot piston extends through the second lower piston and the second lower diaphragm. The first spring is positioned inside the first bore of the first pilot piston. The first spring is configured to move axially between the first lower diaphragm and the first upper diaphragm. The second spring is positioned inside the second upper piston and is configured to move axially within the second upper piston.

In other embodiments, a first restriction wall and a second restriction wall of the combination valve are positioned between the inlet and the outlet. The first restriction wall and the second restriction wall define the passageway for the service flow of fluid. In one embodiment, the combination valve further includes a first bonnet coupled to the valve body. The first bonnet includes a first system pressure port adapted to be coupled to the first control line. The combination valve further includes a second bonnet coupled to the valve body. The second bonnet includes an outlet port venting to the atmosphere.

These and other features, aspects, and advantages of the present invention will become better understood upon consideration of the following detailed description, drawings, and appended claims.

DESCRIPTION OF THE DRAWINGS

FIG. 1 is a isometric view of a normally open valve according to one embodiment;

FIG. 2 is an isometric view of a normally closed valve according to another embodiment;

DETAILED DESCRIPTION

Figure 3:
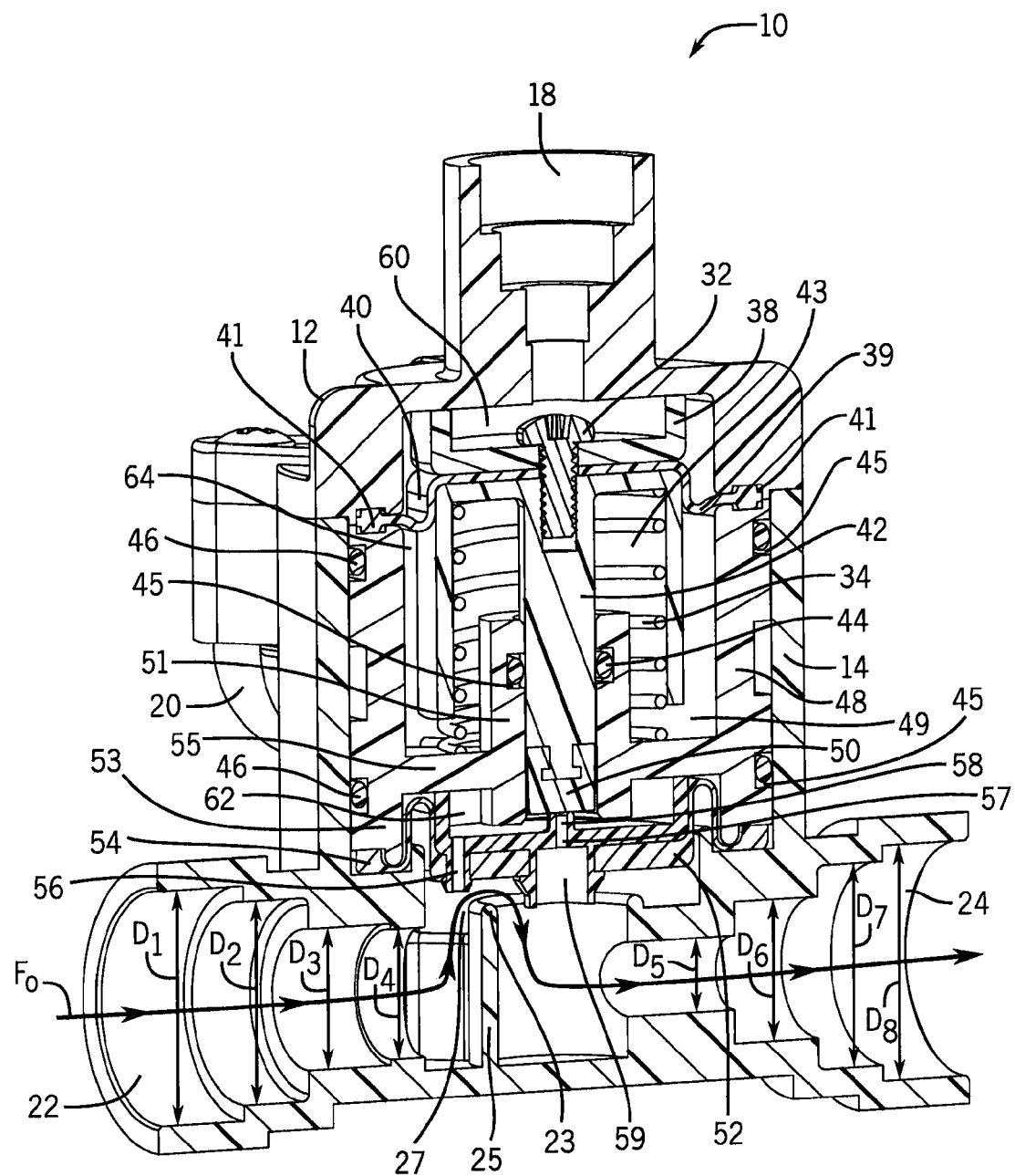
FIG. 3 is a cross-sectional view of the normally open valve of FIG. 1 in the open position, which is generally taken along the line 3-3 of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIGS. 1 and 2 illustrate a normally open valve 10 and a normally closed valve 30 respectively, according to one embodiment. The normally open valve 10 and the normally closed valve 30 are designed to be used in point of use water filtration systems in installations or applications where there is limited or no power. Point of use water filtration systems are generally designed to receive fluid (e.g. water) from a water source and provide the fluid to a point of use to a consumer. In some instances, the filtration system filters the fluid using one or more filter membranes and/or other filtration mechanisms. After filtration, the filtered fluid is delivered to the point of use and exits the system via a faucet or other outlet. In another embodiment, the normally open valve 10 and the normally closed valve 30 can be implemented into commercial or industrial applications on a larger scale. The normally open valve 10 and the normally closed valve 30 can also be used in other applications where there is a need to mechanically actuate a valve using a pressure drop caused by the opening of the system (e.g., when a faucet is opened and water is demanded) and a valve where the service flow cannot come into contact with the control fluid.

Figure 8:
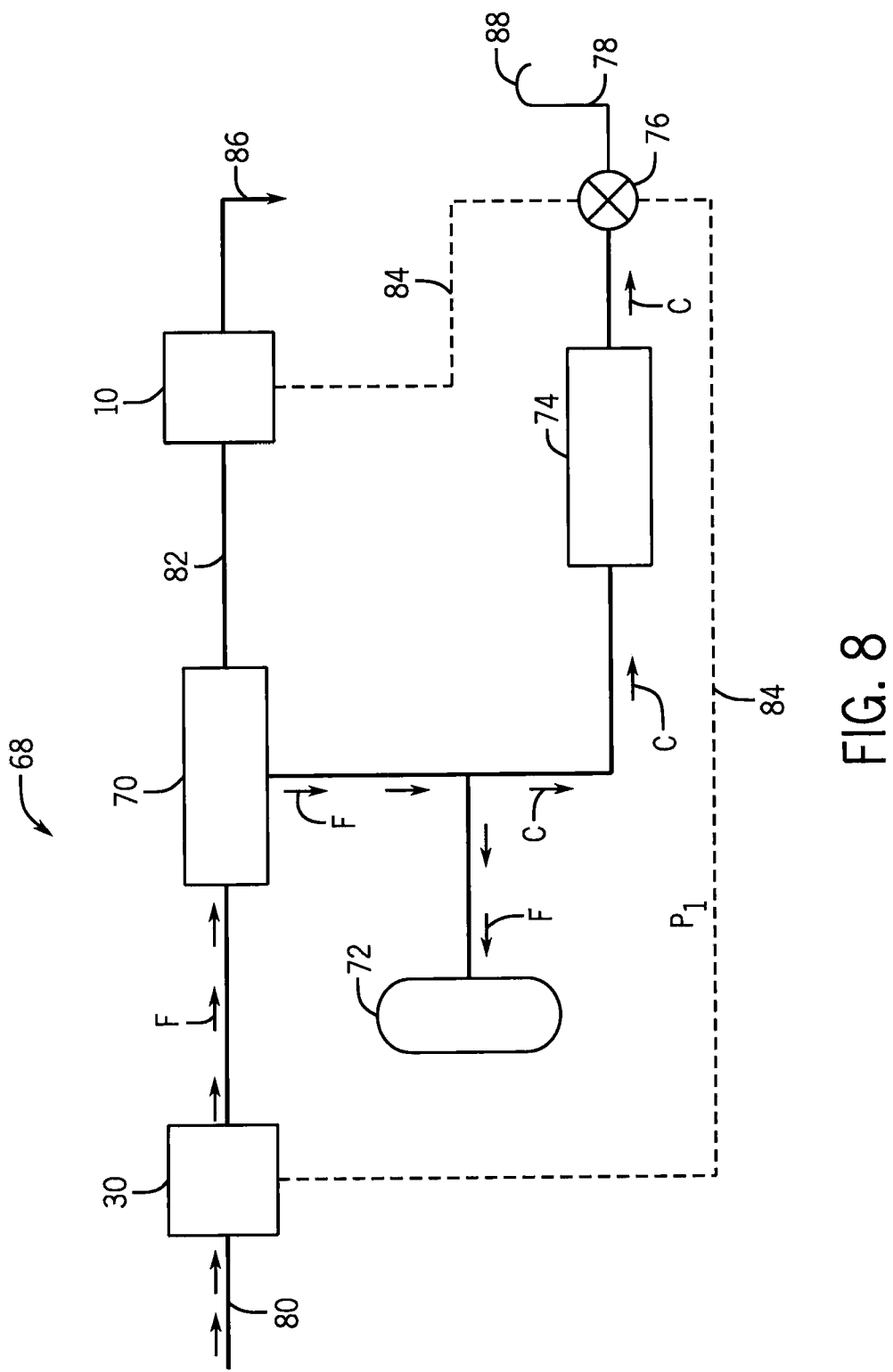
FIG. 8 is a schematic diagram of a fluid flow path during stagnation and a tank fill cycle in a point of use filtration system where the normally closed valve of FIG. 2 is open and the normally open valve of FIG. 1 is closed.

In one embodiment shown in FIG. 1, the normally open valve 10 can include a bonnet 12 and a valve body 14 coupled together by one or more fasteners 16. The valve body 14 can include an inlet 22 and an outlet 24 which can be coupled to a fluid line (e.g., a feed water line 80, or a permeate line 78, respectively of a point of use filtration system 68, as shown in FIG. 8) at a line pressure. The inlet 22 and the outlet 24 can each be provided in the form of a radially concentric cylindrical member having four stepped segments having varying diameters (e.g., from largest to smallest $D_1$, $D_2$, $D_3$, $D_4$ and $D_8$, $D_7$, $D_6$, $D_5$ as shown in FIG. 3), with the outermost diameter being the largest and the innermost diameter being the smallest in order to connect the normally open valve 10 to the feed water line 80, for example. Alternatively, any other suitable connecting mechanisms could be used to connect the normally open valve 10 to the feed water line 80.

Still referring to FIG. 1, the bonnet 12 may include a system pressure port 18 defined by a cylindrical member that extends upwardly away from the bonnet 12. The system pressure port 18 is designed to be coupled to a control line (e.g., a control line 84 of the point of use filtration system 68, as shown in FIG. 8) in order to provide pressure to an upper chamber 60 (see FIG. 3) of the valve body 14 to actuate the normally open valve 10. Although the pressure port 18 is depicted as extending from an upper surface of the bonnet 12, the pressure port 18 may extend from other surfaces of the normally open valve 10 and/or be provided in a different form.

The bonnet 12 is provided to allow access to the inside of the valve body 14. In particular, when the bonnet 12 is detached from the valve body 14, access to the inside of the valve body 14 is provided for cleaning and/or maintenance of the normally open valve 10. The bonnet 12 is releasably coupled to the valve body by one or more fasteners 16. The fasteners 16 may be provided in the form of a bolt, screw, or any suitable fastener. In an alternative embodiment, the bonnet 12 may be heat welded and/or integral with the valve body 14. The bonnet 12 may be formed by injection molding, for example, and constructed of a polymeric material, such as polypropylene.

The valve body 14 is provided as a substantially cylindrical member with three ports defined by openings. The ports are characterized by the inlet 22 and the outlet 24 protruding outwardly from opposing sides of the valve body 14, and a vent 20 protruding outwardly at a point between the inlet 22 and outlet 24 on the opposing side of the valve body 14. The valve body 14 is designed to retain and enclose all of the internal components of the normally open valve 10. In some embodiments, the valve body 14 may be formed by injection molding, for example, and constructed of a polymeric material, such as polypropylene.

The valve body 14 includes the vent 20 that can provide access to the atmosphere. The vent 20 may be defined by a cylindrical member that extends outwardly away from the valve body 14 as depicted in FIG. 1. The vent 20 is provided as an opening (not shown) in the valve body 14 and is designed to alleviate a build-up of excess pressure within the normally open valve 10. Although the vent 20 is depicted as extending outwardly from the cylindrical surface of the valve body 14, the vent 20 may extend from other surfaces of the normally open valve 10 and/or be provided in a different form.

The inlet 22 and the outlet 24 of the valve body 14, as previously described, can be radially concentric, as shown in FIG. 3, to provide a press-fit connection, for example, to a fluid line. In one embodiment, the outermost diameters, namely $D_1$, $D_8$, are 6 millimeters. In other embodiments, the outermost diameters, namely $D_1$, $D_8$, may be between 3 millimeters and 25 millimeters. The remaining diameters of the inlet 22 and the outlet 24 may proportionately, or non-proportionately, decrease as the inner most diameters, namely $D_4$ and $D_5$, are approached. Alternatively, the inlet 22 and the outlet 24 may have internal threads (not shown) that are configured to engage external threads (not shown) of a fluid line in order to connect the normally open valve 10 to the fluid line. In a further embodiment, the inlet 22 and outlet 24 may have smooth interior surfaces that are provided in the form of either a cylindrical or tapered shape, for example, and may be coupled to a fluid line by welding or using other connection mechanisms.

In other embodiments, the inlet 22 and/or the outlet 24 can each include a cartridge assembly (not shown) in order to connect the normally open valve 10 to a fluid line. The cartridge assembly may include one or more of a cartridge body, an o-ring, and a collet gripper. The cartridge body may be a cylindrical, ring-like member constructed of acetal, polypropylene, brass, or stainless steel, for example. The plastic body may be dimensioned to be received in the stepped segment of the inlet 22 and/or the outlet 24 having the largest diameter (i.e., $D_1$ or $D_8$). Alternatively, the cartridge body may be received by any of the other stepped segments of the inlet 22 and/or the outlet 24. The o-ring may be constructed of a nitrite rubber or an ethylene propylene diene monomer (EPDM) rubber, for example. The o-ring may be dimensioned to be received in the stepped segment of the inlet 22 and/or outlet 24 having the second largest diameter (i.e., $D_2$ or $D_7$). Alternatively, the o-ring may be received by any of the other stepped segments of the inlet 22 and/or the outlet 24. The collet gripper may be a sleeve-like member with a substantially cylindrical inner surface and a substantially conical outer surface. The collet gripper may be constructed of acetal or polypropylene, for example. The collet gripper may be dimensioned to be received within the cartridge body by a snap-fit mechanism, for example. One suitable cartridge assembly is a half cartridge assembly sold under the JG Speedfit® brand of John Guest USA Incorporated (New Jersey).

As shown in FIG. 3, the valve body 14 includes a restriction wall 25 positioned between the inlet 22 and the outlet 24. In one embodiment, the restriction wall 25 extends upwardly from the valve body 14 and terminates at a rounded top portion 23 to provide a fluid path for a service flow, as indicated by arrows representing flow path $F_o$. The service flow $F_o$ may be the flow of fluid provided to the inlet 22 of the normally open valve 10 in the point of use filtration system 68, as shown in FIG. 8, for example. The restriction wall 25 is provided to disrupt the linear flow of fluid through the valve body 14 and to direct fluid upwardly by changing the flow path of the liquid. To that end, the restriction wall 25 can be cylindrical in shape or any other suitable shape to restrict or otherwise impede the fluid flow path of service flow $F_o$. Thus, when the valve 10 is open, as shown in FIG. 3, the restriction wall 25 defines an opening 27 with the smallest diameter (e.g., $D_4$) that allows the service flow $F_o$ to travel up over the restriction wall 25, through the opening 27 to the outlet 24.

As shown in FIG. 3, the system pressure port 18, like the inlet 22 and the outlet 24, can be radially concentric having four diameters (not labeled) with the outermost diameter being the largest and the innermost diameter being the smallest in order to connect the normally open valve 10 to the control line 84 shown in FIG. 8. In one embodiment, the system pressure port 18 can be radially concentric to provide a press-fit connection, for example, to the control line 84. In one embodiment, the outermost diameter may be 6 millimeters. The remaining diameters of the system pressure port 18 may proportionately, or non-proportionately, decrease as the inner most diameter is approached. Alternatively, the system pressure port 18 may have internal threads (not shown) that are configured to engage external threads (not shown) of the control line in order to connect the normally open valve 10 to the control line. In a further embodiment, the system pressure port 18 may have a smooth inside surface that is provided in the form of either a cylindrical or tapered shape, for example, and may be coupled to control line by welding.

As depicted in FIG. 3, the system pressure port 18 is in communication with the upper chamber 60. The pressure provided in the upper chamber 60 may generate a force on components within the valve body 14 to actuate the normally open valve 10, as described below. The interior walls of an upper piston 38 having a cylindrical shape, for example, can define the boundaries of the upper chamber 60. The upper chamber 60 may have a volume of 3 milliliters. The upper piston 38 can be coupled to a pilot piston 42 by a diaphragm fastener 32. The diaphragm fastener 32 may be any suitable fastener, such as, for example, a screw of bolt, constructed of any suitable metallic or polymeric material. Both the upper piston 38 and the pilot piston 42 may be constructed of any suitable polymeric material, for example, polypropylene. The pilot piston 42 can have a generally cylindrical shape, which defines an inner bore 43 that is configured to receive a normally open spring 34. The normally open spring 34 can set the normally open valve 10 in the open position, as long as the control line pressure at the system pressure port 18 is below a pressure set point. The pressure set point is the threshold amount of pressure required to actuate the normally open valve 10. In some embodiments, the pressure set point is 69 kPa. In other embodiments, the pressure set point is 60 kPa, 65 kPa, 70 kPa, or 75 kPa. Thus, the normally open spring 34 is calibrated to determine how much pressure is required to axially move the pilot piston 42 to actuate the normally open valve 10 at a pressure above or below the pressure set point.

Attached to the lower portion of the pilot piston 42 is a plunger 50. The plunger 50 may be substantially cylindrical in shape and constructed of a polymeric material, such as polyurethane. The plunger 50 is configured to engage or otherwise interact with a pilot 58, as shown in FIG. 3, which may be provided in the form of a vent opening or bleed port, for example. Thus, the service flow $F_o$ may be inhibited from entering a lower chamber 62 of the valve body 14 when the valve 10 is in the open position, as described in more detail below.

Still referring to FIG. 3, a compression element 48 is provided that surrounds the pilot piston 42. An inner wall 49 of the compression element 48 and a lower side 39 of an upper diaphragm 40 collectively define a middle chamber 64. The upper diaphragm 40 includes two flanged portions 41 that are secured in place between the bonnet 12 and the valve body 14. The middle chamber 64 may have a volume of 7 milliliters. The compression element 48 can be substantially cylindrical in shape and may engage the inner surface of the valve body 14. The compression element 48 is stationary and is formed by an inner sleeve 51 and an outer sleeve 53 that are coupled by a disc-like plate 55. The compression element 48 can have recesses 45 adjacent both the inner sleeve 51 and the outer sleeve 53. The recess 45 adjacent the inner sleeve 51 is configured to receive a piston O-ring 44, and the recesses 45 adjacent the outer sleeve 53 are each configured to receive an upper and a lower shaft guide O-ring 46. The compression element 48 can also secure the upper diaphragm 40 and a lower diaphragm 54 between the bonnet 12 and the valve body 14. In some embodiments, the compression element 48 may be formed by injection molding, for example, and constructed of a polymeric material, such as polypropylene.

Still referring to FIG. 3, the upper diaphragm 40 is positioned between the upper piston 38 and the pilot piston 42. As the pilot piston 42 translates within the valve body 14, the flanged portions 41 help retain the upper diaphragm 40 in place. In one embodiment, the upper diaphragm 40, as well as the lower diaphragm 54, are fiber reinforced rubber diaphragms having a rubber coating on one or more sides of the fiber.

A lower piston 52 may be provided between the lower diaphragm 54 and the pilot piston 42. The interior walls of the lower piston 52 may have a cylindrical shape, for example, that define the boundaries of the lower chamber 62. The lower chamber 62 may have a volume of 1.5 milliliters. The lower piston 52 can include a bleed opening 56 and the pilot 58. The bleed opening 56 can be a small diameter passageway extending through a bottom portion of the lower piston 52 and through the lower diaphragm 54. The bleed opening 56 can vent the service flow $F_o$ entering at the inlet 22 of the normally open valve 10. The pilot 58, as previously described, can include a first passageway 57 in communication with a second passageway 59. The first passageway 57 may have a diameter that extends through the bottom portion of the lower piston 52 and through the lower diaphragm 54. The second passageway 59 may have a diameter, which is larger than the diameter of the first passageway 57 that extends into the service flow path $F_o$ between the inlet 22 and the outlet 24.

Figure 4:
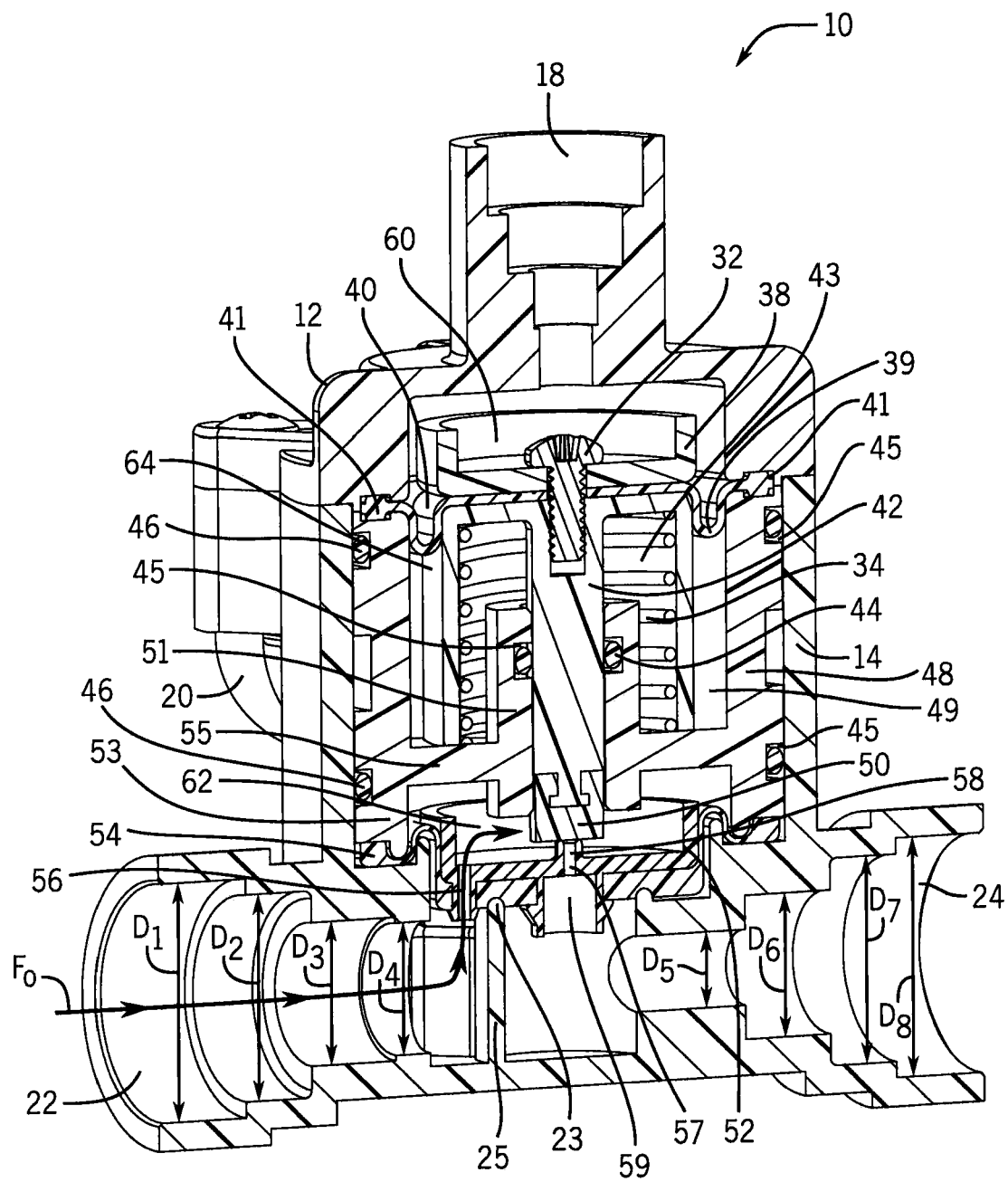
FIG. 4 is a cross-sectional view of the normally open valve of FIG. 1 in the closed position, which is generally taken along the line 4-4 of FIG. 1.

Generally, the normally open valve 10 begins operation in the open position, as shown in FIG. 3. Once the system or control line pressure is greater than the pressure set point, the normally open valve 10 moves to a closed position, as shown in FIG. 4. In one embodiment, the system may be the point of use filtration system 68 depicted in FIGS. 8 and 9 having the control line 84 coupled to the system pressure port 18 of the normally open valve 10. The system or control line pressure, represented as $P_1$ in FIGS. 8 and 9, becomes greater than the pressure set point of the normally open valve 10 due to opening and/or closing of a point of use, such as a faucet 88, in the fluid system. The pressure set point may be measured at the system pressure port 18, which is determined by the strength of the normally open spring 34. More specifically, if the system or control line pressure $P_1$ is less than the pressure set point at the system pressure port 18, the normally open valve 10 will remain in an open position with the vent 20 venting to the atmosphere.

With the normally open valve 10 in the open position, the service flow fluid $F_o$ can flow around the top portion 23 of the restriction wall 25 through the opening 27 between the inlet 22 and outwardly toward the outlet 24, as shown in FIG. 3. Any excess service flow fluid $F_o$ can be vented through the bleed opening 56 and the pilot 58. The service flow fluid $F_o$ can continue to flow between the inlet 22 and the outlet 24 until the system is manually closed (e.g., by the faucet 88 being closed in the point of use filtration system 68). The control line 84 then reaches the pressure set point, allowing the upper chamber 60 of the valve body 14 to become pressurized. Once the upper chamber 60 becomes pressurized above the pressure set point, the upper piston 38 will be forced downwardly, compressing the normally open spring 34. Simultaneously, the plunger 50 puts pressure on the lower piston 52 and the lower diaphragm 54 to partially or fully obstruct the pilot 58. With the plunger 50 partially or fully obstructing the pilot 58, pressure builds up on a top side of the lower diaphragm 54, which with the assistance of force provided by the upper piston 38, closes the normally open valve 10, as shown in FIG. 4. Thus, the service flow fluid $F_o$ cannot flow through the outlet 24 when the normally open valve 10 is in the closed position. Further, the service flow fluid $F_o$ cannot flow in the opposite direction of the arrowed line (e.g., out through the inlet 22) when the normally oven valve 10 is in the closed position as shown in FIG. 4.

As described in the above embodiment, there are numerous advantages to the valve 10. The sealing mechanism (including the lower piston 52 adjacent to the lower diaphragm 54, used to close and open the valve 10) is separate from the upper piston 38 that is being actuated. The upper piston 38 is therefore not influenced by differential pressure like a direct acting valve would be. This allows for the normally open valve 10 to close above a pressure set point and open below the same pressure point at a wide range of operating pressures, as well as a control pressure that is lower than the pressure at the inlet 22, without causing differential pressure problems. Also, the normally open valve 10 can operate consistently, regardless of the system pressure because the middle chamber 64 of the valve body 14 has a much greater volume than the lower chamber 62, and little to no adjustments to the normally open valve 10 are required. Therefore, the valve 10 is more reliable than conventional fully mechanical valves that rely on specific system pressures. Furthermore, the normally open valve 10 does not use external components to operate as is necessary with conventional fully mechanical valves.

As shown in FIG. 2, similar to the normally open valve 10, the normally closed valve 30 can include a bonnet 12 and a valve body 14 coupled together by one or more fasteners 16. The normally closed valve 30 depicted is substantially identical to the overall structure of the normally open valve 10, except for the differences that are generally noted here and will be described in further detail below. More particularly, the location of the system pressure port 18, the location of the vent/outlet port 20, and the location and construction of the spring are all different from the normally open valve 10. Thus, like numerals will be used to describe the normally closed valve 30 and are labeled as such in the Figures.

Figure 5:
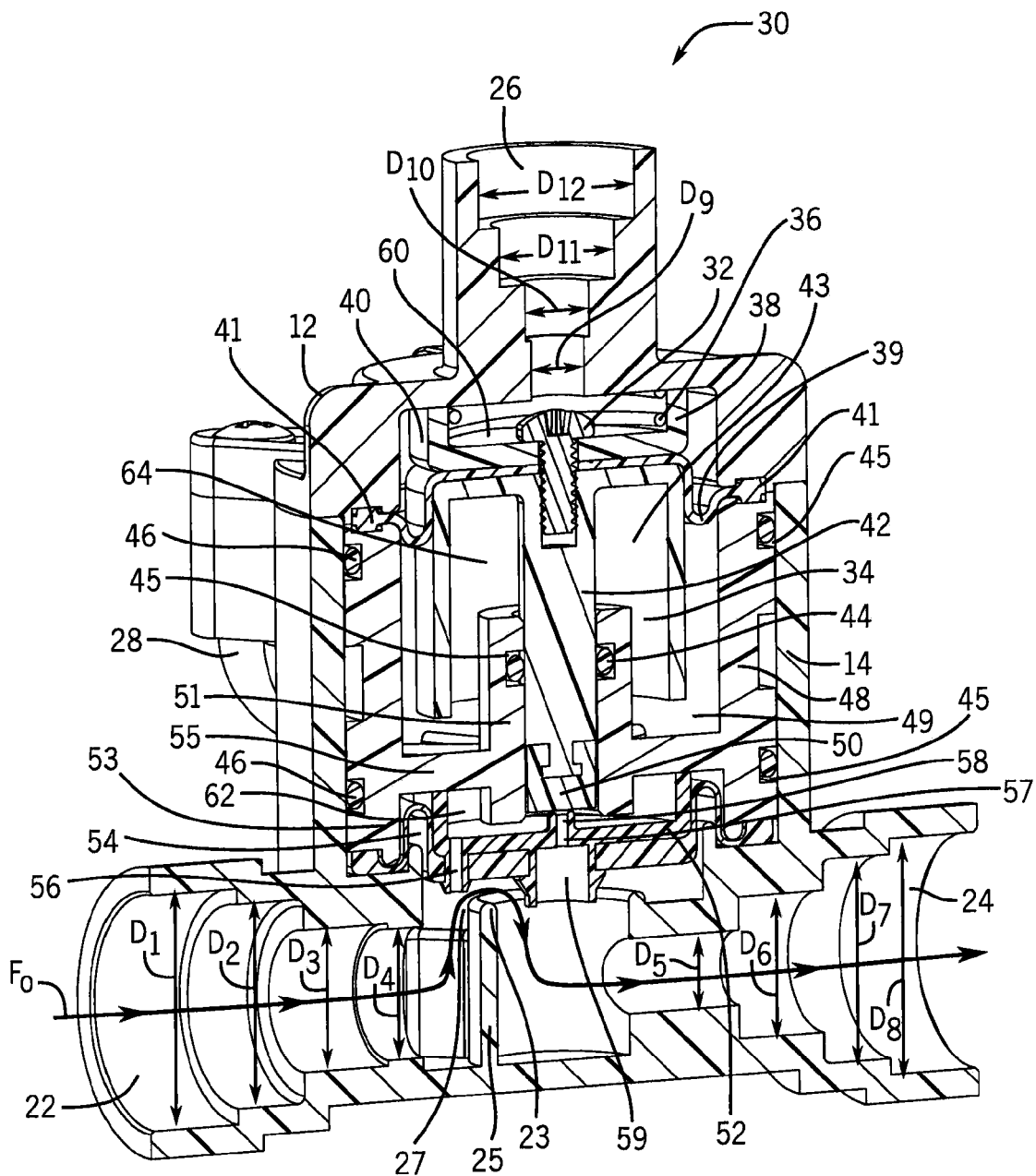
FIG. 5 is a cross-sectional view of the normally closed valve of FIG. 2 in the open position, which is generally taken along the line 5-5 of FIG. 2.
Figure 7:
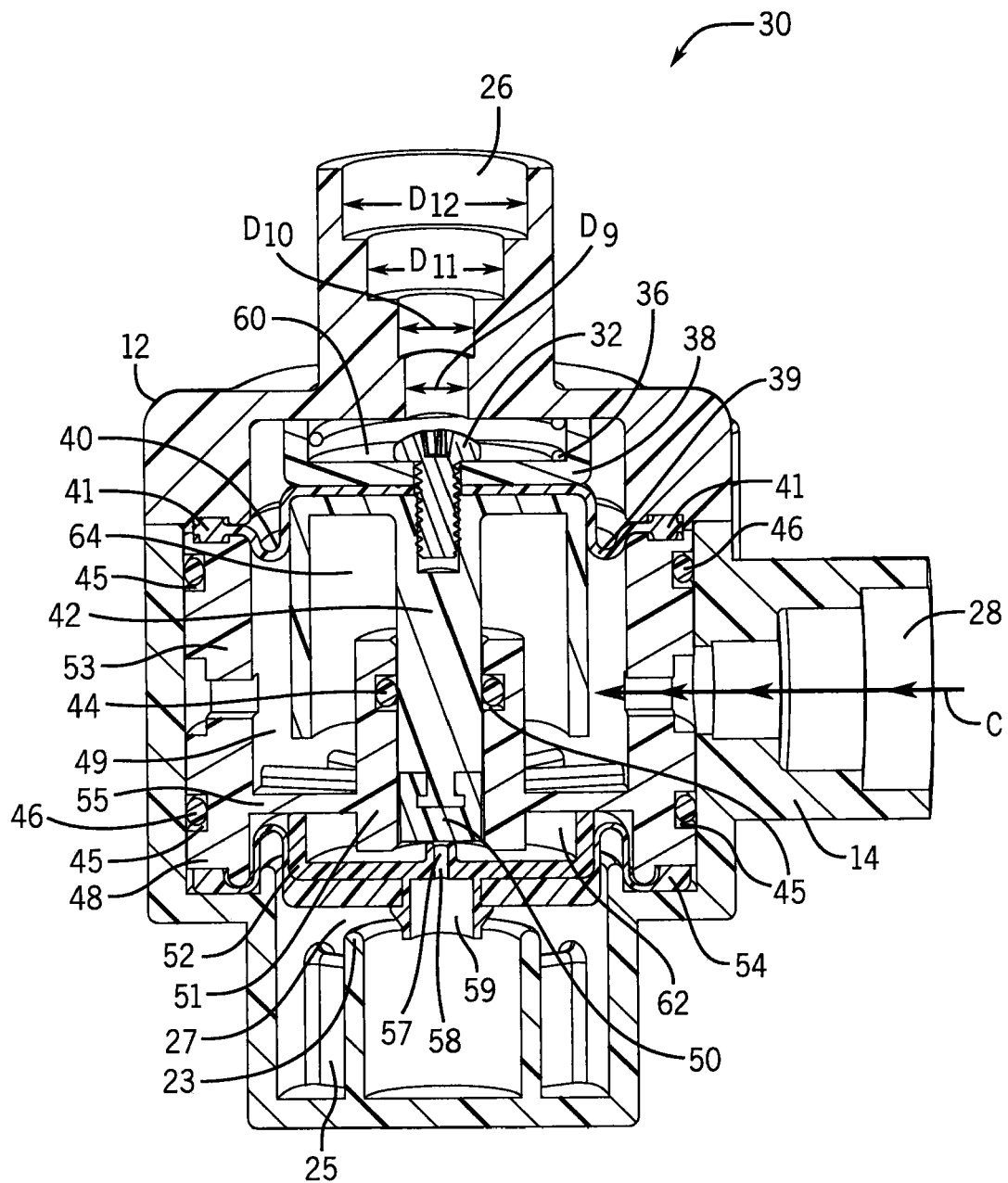
FIG. 7 is a cross-sectional view of the normally closed valve of FIG. 2 in the open position, which is generally taken along line 7-7 of FIG. 2.

Referring to FIGS. 2 and 5, the valve body 14 of the normally closed valve 30 may include a system pressure port 28 defined by a cylindrical member that extends outwardly away from the valve body 14. The system pressure port 28 is designed to be coupled to a control line (e.g., the control line 84 of the point of use filtration system 68, as shown in FIG. 8) in order to provide pressure to a middle chamber 64 of the valve body 14 to actuate the normally closed valve 30. Although the system pressure port 28 is depicted as extending outwardly from the cylindrical surface of the valve body 14, the system pressure port 28 may extend from other surfaces of the normally closed valve 30 and/or be provided in a different form. As shown in FIG. 7, the system pressure port 28, like the inlet and the outlet 24, can be radially concentric having four diameters (not labeled) with the outer most diameter being the largest and the innermost diameter being the smallest in order to connect the normally closed valve 30 to the control line 84 shown in FIG. 8. The system pressure port 28 may be configured to receive a control fluid, as indicated by arrows representing flow path C, to help pressurize the control line 84 as will be described in more detail below The bonnet 12 of the normally closed valve 30 includes an outlet port 26 that can provide access to the atmosphere. The outlet port 26 may be defined by a cylindrical member that extends upwardly away from the bonnet 12. The outlet port 26 is provided as an opening in the bonnet 12 and is designed to alleviate a build-up of excess pressure within the normally closed valve 30. The outlet port 26 can be provided in the form of a radially concentric cylindrical member having four stepped segments having varying diameters (e.g., from largest to smallest $D_{12}$, $D_{11}$, $D_{10}$, $D_9$ as shown in FIG. 5), with the outermost diameter being the largest and the innermost diameter being the smallest. Although the outlet port 26 is depicted as extending upwardly from the bonnet 12, the outlet port 26 may extend from other surfaces of the normally closed valve 30 and/or be provided in a different form.

The outlet port 26 of the normally closed valve 30, which is exposed to the atmosphere, also opens to an upper chamber 60. The upper chamber 60 may be configured to receive a normally closed spring 36, which can rest in a bore defined by the interior walls of the upper piston 38. The normally closed spring 36 can set the normally closed valve 30 in the closed position, as long as the control line pressure at the system pressure port 28 is below the pressure set point. Similarly, as previously described with respect to the normally open valve 10, the pressure set point is the threshold amount of pressure required to actuate the normally closed valve 30. In some embodiments, the pressure set point is 69 kPa. In other embodiments, the pressure set point is 60 kPa, 65 kPa, 70 kPa, or 75 kPa. Thus, the normally closed spring 36 is calibrated to determine how much pressure is required to actuate the normally closed valve 30 at a pressure above or below the pressure set point.

Figure 6:
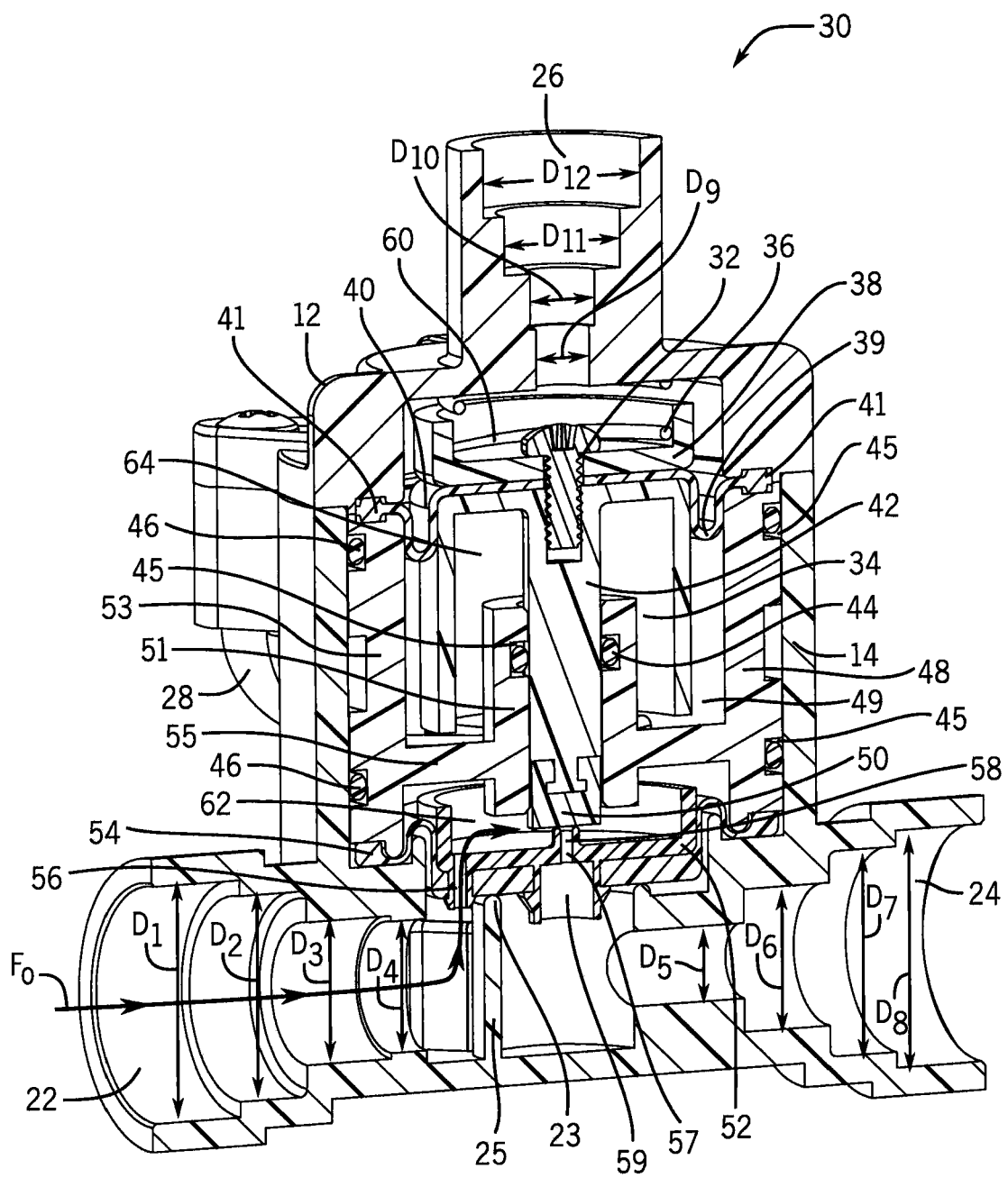
FIG. 6 is a cross-sectional view of the normally closed valve of FIG. 2 in the closed position, which is generally taken along the line 6-6 of FIG. 2.

Generally, the normally closed valve 30 begins operation in the closed position, shown in FIG. 6. Once the system or control line pressure is greater than a pressure set point, the valve 30 moves to an open position, as shown in FIG. 5. In one embodiment, the system may be the point of use filtration system 68 depicted in FIGS. 8 and 9 having the control line 84 coupled to the system pressure port 28 of the normally closed valve 30. The system or control line pressure, represented as $P_1$ in FIGS. 8 and 9, becomes greater than the pressure set point of the normally closed valve 30 due to opening and/or closing of the point of use, such as a faucet 88, in the fluid system. The pressure set point may be measured at the system pressure port 28, which is determined by the strength of the normally closed spring 36. More specifically, if the system or control line pressure $P_1$ is less than the pressure set point at the system pressure port 28, the normally closed valve 30 will remain in a closed position with the outlet port 26 venting to atmosphere.

With the normally closed valve 30 in the closed position, the service flow fluid $F_o$ is restricted from flowing through the inlet 22 to the outlet 24, as shown in FIG. 6. Also, when the normally closed valve 30 is in the closed position, backflow of the service flow fluid $F_o$ is prevented. The service flow fluid $F_o$ cannot flow between the inlet 22 and the outlet 24 until the system is manually closed (e.g., by the faucet 88 being closed). The control line 84 then reaches the pressure set point, as determined by the strength of the normally closed spring 36. Once the control pressure rises above the pressure set point, the middle chamber 64 becomes pressurized and forces the upper piston 38 axially upwardly. The upper piston 38 forced upwardly causes a pressure drop on a top side of the lower diaphragm 54, and the pressure drop causes the pressure at the inlet 22 to force the lower piston 52 upwardly, which forces the normally closed valve 30 into the open position. Once in the open position, the service flow fluid $F_o$ can flow between the inlet 22 and the outlet 24, as shown in FIG. 5.

As described in the above embodiment, there are some advantages to the normally closed valve 30. The sealing mechanism (including the lower piston 52 adjacent to the lower diaphragm 54 used to close and open the valve) is separate from the upper piston 38 that is being actuated. The upper piston 38 is therefore not as influenced by differential pressure as a direct acting valve would be. This configuration allows for the normally closed valve 30 to close above a pressure set point and open below the same pressure set point at a wide range of operating pressures, as well as a control pressure that is lower than the pressure at the inlet 22, without causing differential pressure problems (e.g., valve circulation problems). Also, because the middle chamber 64 has a much greater volume than the upper chamber 60, and little to no adjustments to the normally closed valve 30 are required, the normally closed valve 30 can operate consistently, regardless of the pressure. Therefore, the normally closed valve 30 is more reliable than conventional fully mechanical valves that rely on specific system pressures. Also, the normally closed valve 30 does not use external components to operate as is necessary with other conventional fully mechanical valves.

Figure 9:
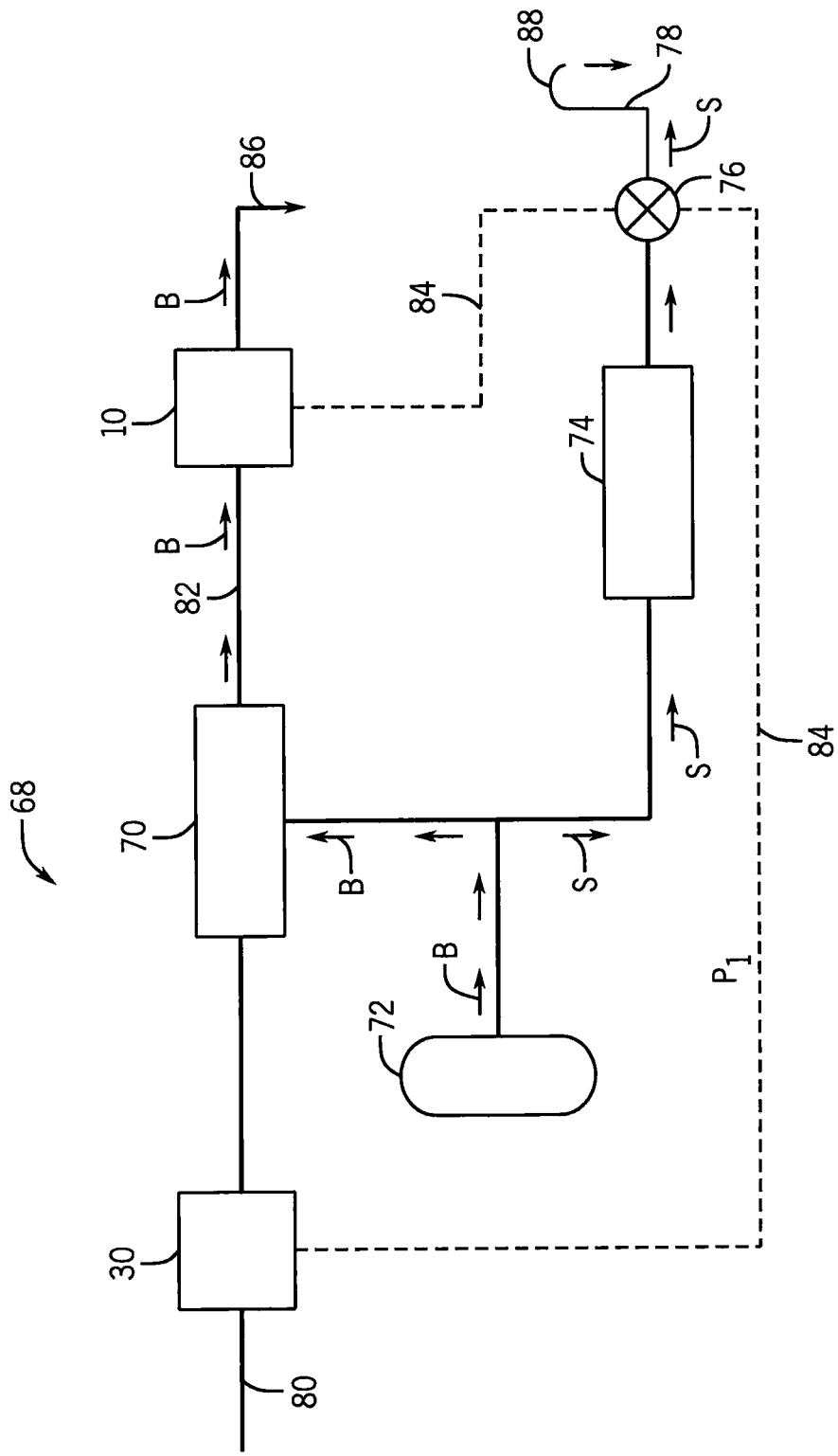
FIG. 9 is a schematic diagram of a fluid flow path during a service cycle and a backwash cycle in a point of use filtration system where the normally closed valve of FIG. 2 is closed and the normally open valve of FIG. 1 is open.

Turning now to FIGS. 8 and 9, one example of the point of use filtration system 68 in which the normally open valve 10 and the normally closed valve 30 can be used is shown. The filtration system 68 includes the feed water line 80 coupled to the normally closed valve 30 and the first filtration or ultrafiltration element 70. Downstream from the ultrafiltration element 70 is an accumulator tank 72 and a second filtration or a microfiltration element 74. Connected to the microfiltration element 74 is a control switch 76 that connects the normally closed valve 30 and the normally open valve 10 via the control line 84. A permeate line 78 and the faucet 88 are also downstream from the pressure control switch 76 where the permeate exits the filtration system 68, as represented by the fluid flow path S in FIG. 9. Concentrate, as represented by the fluid flow path B in FIG. 9, exits the filtration system 68 through a drain line 82 and the normally open valve 10 to a drain 86.

FIG. 8 illustrates the flow of feed water, as represented by the fluid flow path F, through the point of use filtration system 68 during periods of stagnation or during a tank fill cycle. During the tank fill cycle, the faucet 88 is closed and the feed water F enters the filtration system 68 through the feed water line 80 and flows through the normally closed valve 30 that is open due to pressure $P_1$ in the control line 84. In one embodiment, until the filtration system 68 is fully operational, the normally closed valve 30 at the inlet can be a manual valve. When the pressure in the control line 84 is above the pressure set point (e.g., 69 kPa), the normally closed valve 30 is open and the normally open valve 10 is closed. When the pressure in the control line 84 is below the pressure set point, the normally closed valve 30 is closed and the normally open valve 10 is open. As the feed water passes through the ultrafiltration element 70, permeate water fills and pressurizes the accumulator tank 72 downstream until the pressure in the accumulator tank 72 is equal to the pressure in the feed water line 80. While permeate water fills the accumulator tank 72, the permeate water continues to flow, as indicated by arrows representing flow path C in FIG. 8, past the accumulator tank 72 through the permeate line 78, through the microfiltration element 74, thereby providing pressure $P_1$ to the control line 84. In some embodiments, some portion of the fluid represented by flow path C enters the control line 84, and may be referred to as a control fluid. Once the pressure $P_1$ in the control line 84 reaches the pressure set point, the control switch 76 is activated. The normally closed valve 30 opens at the inlet and the normally open valve 10 closes at the drain line 82, as shown in FIGS. 8 and 9.

FIG. 9 illustrates the flow of feed water during the service, or in use, cycle of the point of use filtration system 68. During the service cycle, the normally closed valve 30 is closed and the normally open valve 10 is open. The service cycle can begin whenever the user opens the faucet 88, which causes a pressure drop in the control line 84. The pressure drop causes the normally closed valve 30 at the inlet to close and the normally open valve 10 at the drain 86 to open, in absence of power. Thus, the pressure drop in the control line 84 causes the pressure $P_1$ to drop below the pressure set point, which in turn causes the normally closed valve 30 to close and the normally open valve 10 to open. The actuation of valves 10 and 30 will substantially, immediately, and/or automatically cause a portion of the accumulated pressurized water in the accumulator tank 72 to flow upstream to mechanically put the ultrafiltration element 70 into a backwash cycle, as indicated by arrows representing flow path B. Any concentrate remaining from the backwash cycle can exit the filtration system 68 through the drain line 82 and the normally open valve 10 to the drain 86. Another portion of accumulated pressurized water in the accumulator tank 72 will flow downstream through the feed water line 80 to provide service water S that will pass through the microfiltration element 74 before exiting through the permeate line 78 and the faucet 88. As long as the permeate is being dispensed through the permeate line 78 and the faucet 88 is open, the ultrafiltration element 70 will be in the backwash cycle. Once the faucet 88 is closed, backwashing will stop and the pressure $P_1$ will increase in the control line 84, causing the valves 30 and 10 to actuate back to the opened and closed positions, respectively.

Figure 10:
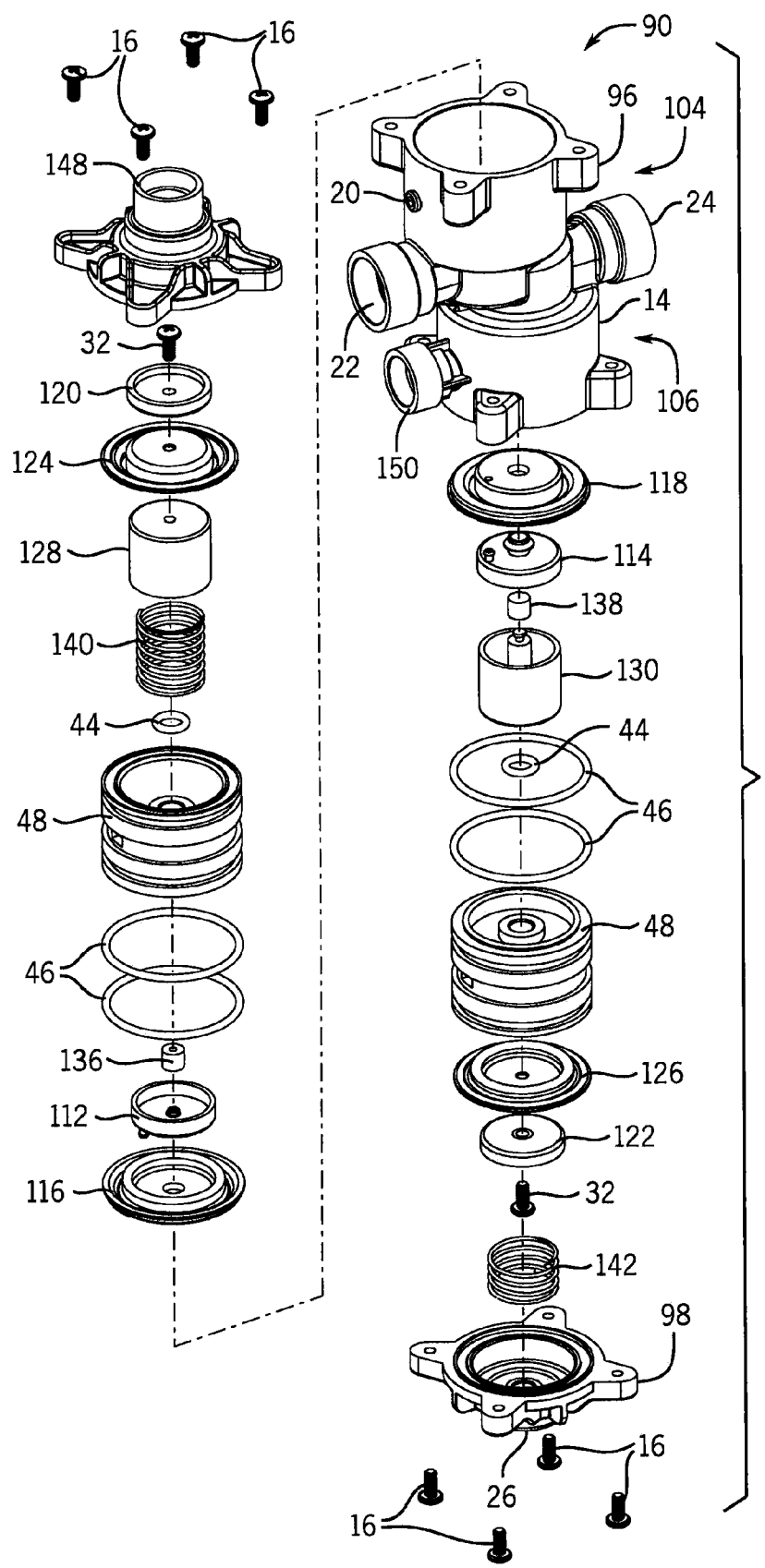
FIG. 10 is an exploded isometric view of a combination valve according to one embodiment.
Figure 11:
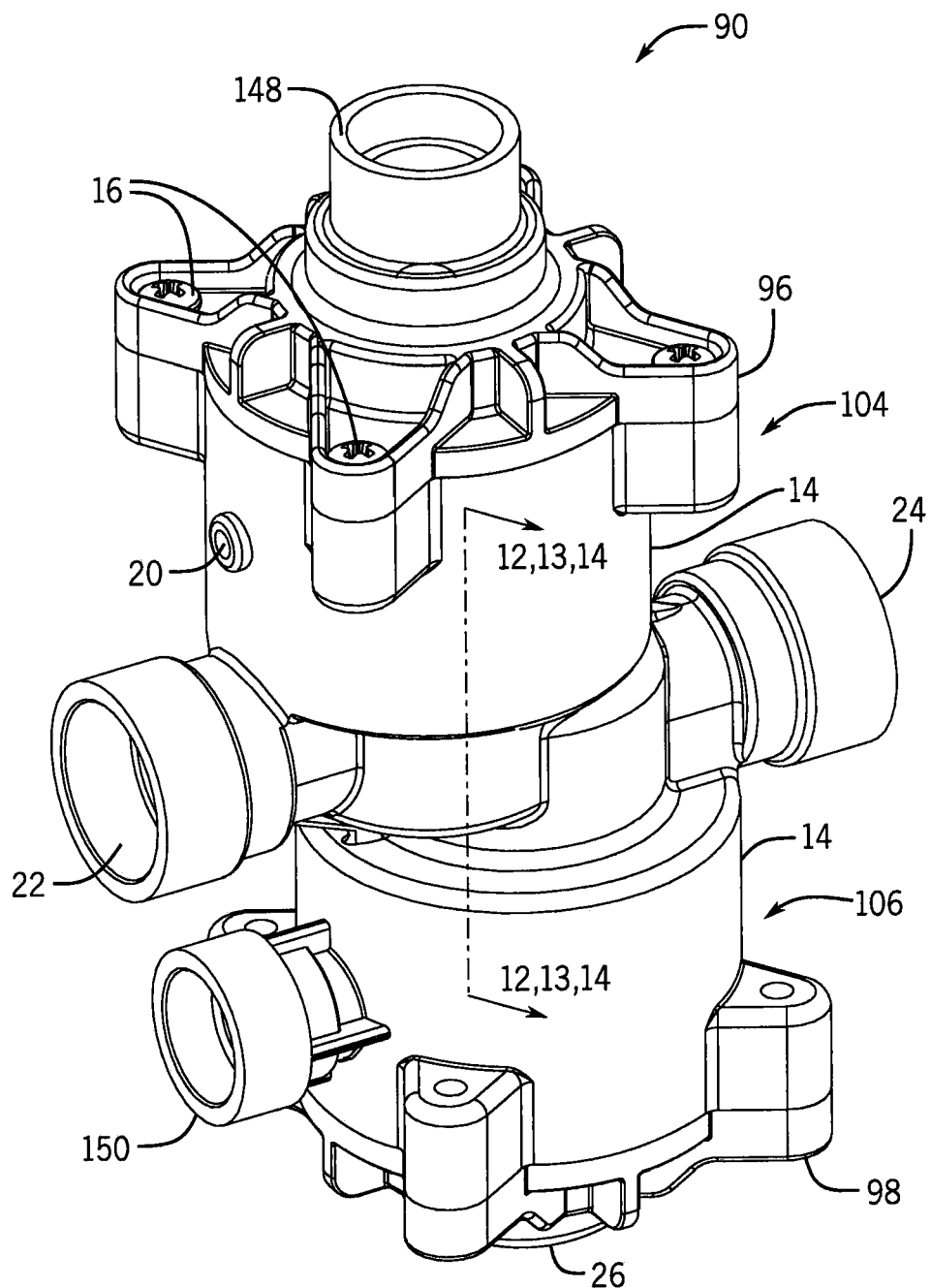
FIG. 11 an isometric view of the combination valve of FIG. 10.
Figure 15:
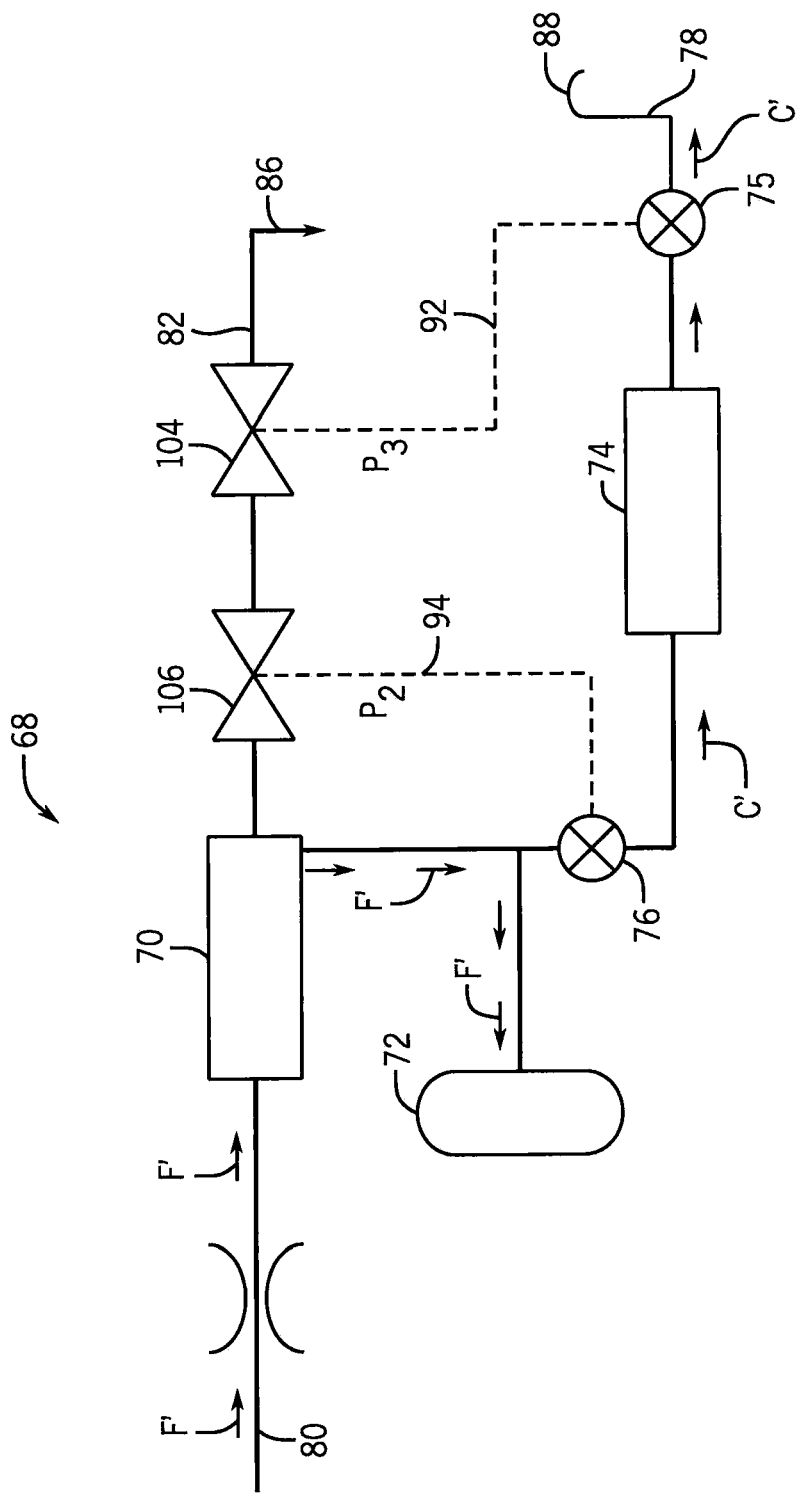
FIG. 15 is a schematic diagram of a point of use filtration system having the combination valve of FIG. 10, whereby the point of use filtration system is depicted in a stagnation state and a tank fill cycle.
Figure 16:
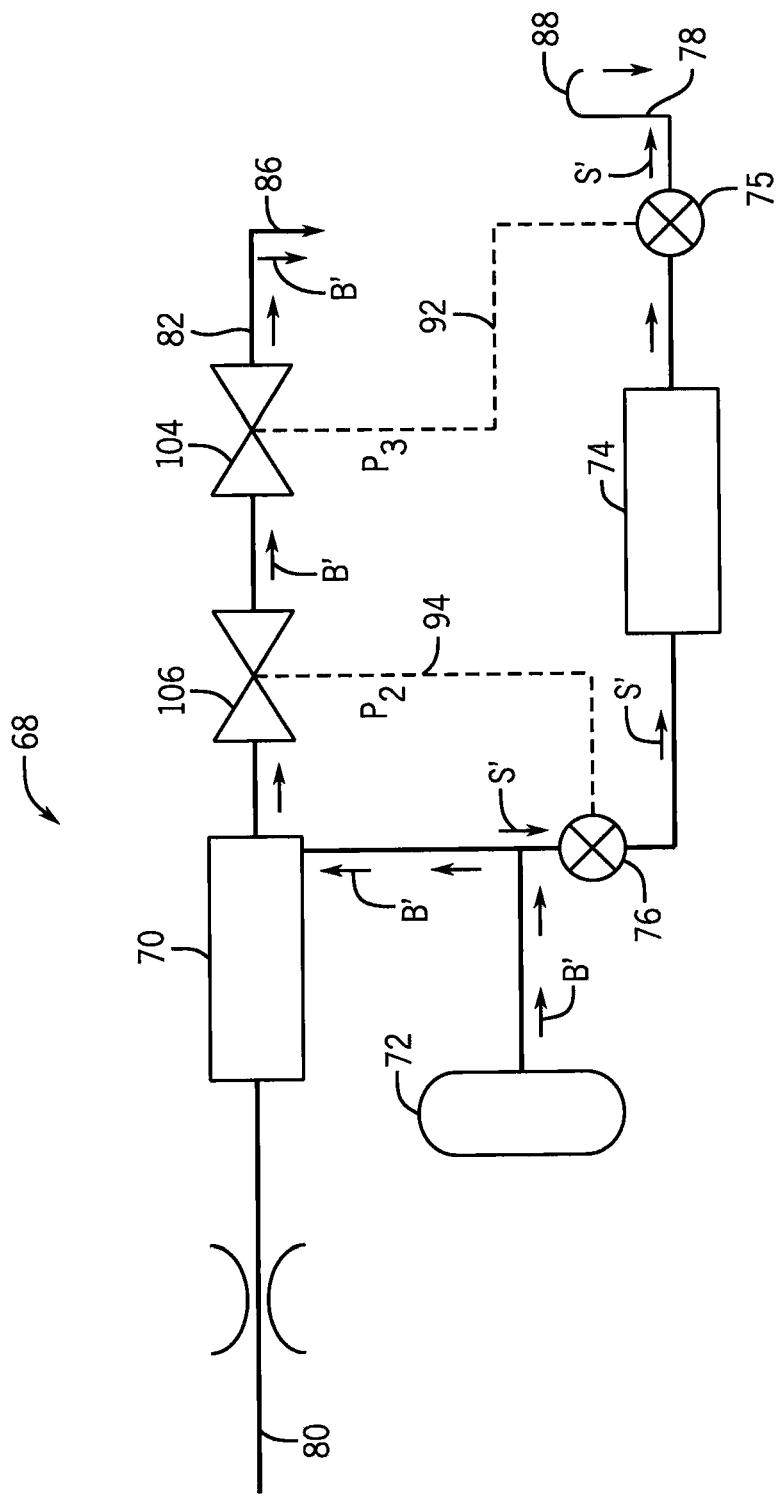
FIG. 16 is a schematic diagram of the point of use filtration system of FIG. 15 during a service cycle and a backwash cycle.

In another embodiment, as shown in FIGS. 10 and 11, a combination valve 90 can be provided that is defined by a normally open valve portion 104 and a normally closed valve portion 106. In one embodiment, the combination valve 90 can allow for installation of a point of use filtration system 68, as shown in FIGS. 15 and 16, at zero pressure. The combination valve 90 is represented in FIGS. 15 and 16 as the normally open valve portion 104 and the normally closed valve portion 106. The normally open valve portion 104 and the normally closed valve portion 106 are depicted, which are substantially identical to the overall structure of the normally open valve 10 and the normally closed valve 30, respectively, except for the differences which are noted below. Thus, similar reference numerals used to describe the normally open valve 10 and the normally closed valve 30 will be used to describe the combination valve 90.

Referring to FIG. 11, instead of the normally open valve portion 104 having a vent 20 defined by a cylindrical member that extends outwardly at a point between the inlet 22 and the outlet 24, as shown in FIG. 1, the normally open valve portion 104 includes a vent 20 that extends outwardly at a point above the inlet 22 on the side of the valve body 14. Similarly, instead of the normally closed valve portion 106 having the system pressure port 28 outwardly extending between a point between the inlet 22 and the outlet 24, as shown in FIG. 2, the normally closed valve portion 106 includes a second system pressure port 150 that extends outwardly at a point below the inlet 22 on the side of the valve body 24.

The combination valve 90 can further include a first bonnet 96, a second bonnet 98, and a valve body 14 coupled together by one or more fasteners 16. The valve body 14 is positioned between the first bonnet 96 and the second bonnet 98. The valve body 14 can include an inlet 22 and an outlet 24, which can be coupled to a fluid line (e.g., a feed water or permeate line, not shown) at a line pressure.

Still referring to FIGS. 10 and 11, the first bonnet 96 may include a first system pressure port 148 defined by a cylindrical member that extends upwardly away from the first bonnet 96. The first system pressure port 148 is designed to be coupled to a first control line 92, as shown in the point of use filtration system 68 in FIG. 15, in order to provide pressure to an upper chamber of the valve body 14 to actuate the normally open valve portion 104. Although the pressure port 148 is depicted as extending from an upper surface of the first bonnet 96, the pressure port 148 may extend from other surfaces of the normally open valve portion 104 and/or be provided in a different form.

Similarly, the valve body 14 may include the second system pressure port 150 defined by a cylindrical member that extends outwardly away from the valve body 14 of the normally closed valve portion 106. The second system pressure port 150 is designed to be coupled to a control line 94, as shown in the point of use filtration system 68 in FIG. 15, in order to provide pressure to a middle chamber of the valve body 14 to actuate the normally closed valve portion 106. Although the second system pressure port 150 is depicted as extending outwardly from the cylindrical surface of the valve body 14, the second system pressure port 150 may extend from other surfaces of the normally closed valve portion 106 and/or be provided in a different form.

The valve body 14 is designed to retain and enclose all of the internal components of the normally open valve portion 104 and the normally closed valve portion 106. In some embodiments, the valve body 14 may be formed by injection molding, for example, and constructed of a polymeric material, such as polypropylene. In one embodiment, the valve body 14 of the normally open valve portion 104 and the valve body 14 of the normally closed valve portion 106 may be a single integral mold. In other embodiments, the valve body 14 of the normally open valve portion 104 and the valve body 14 of the normally closed valve portion are separate components to allow for additional normally open valve portions 104 and/or normally closed valve portions 106 to be incorporated into the combination valve 90, for example in a stacked manner.

Figure 12:
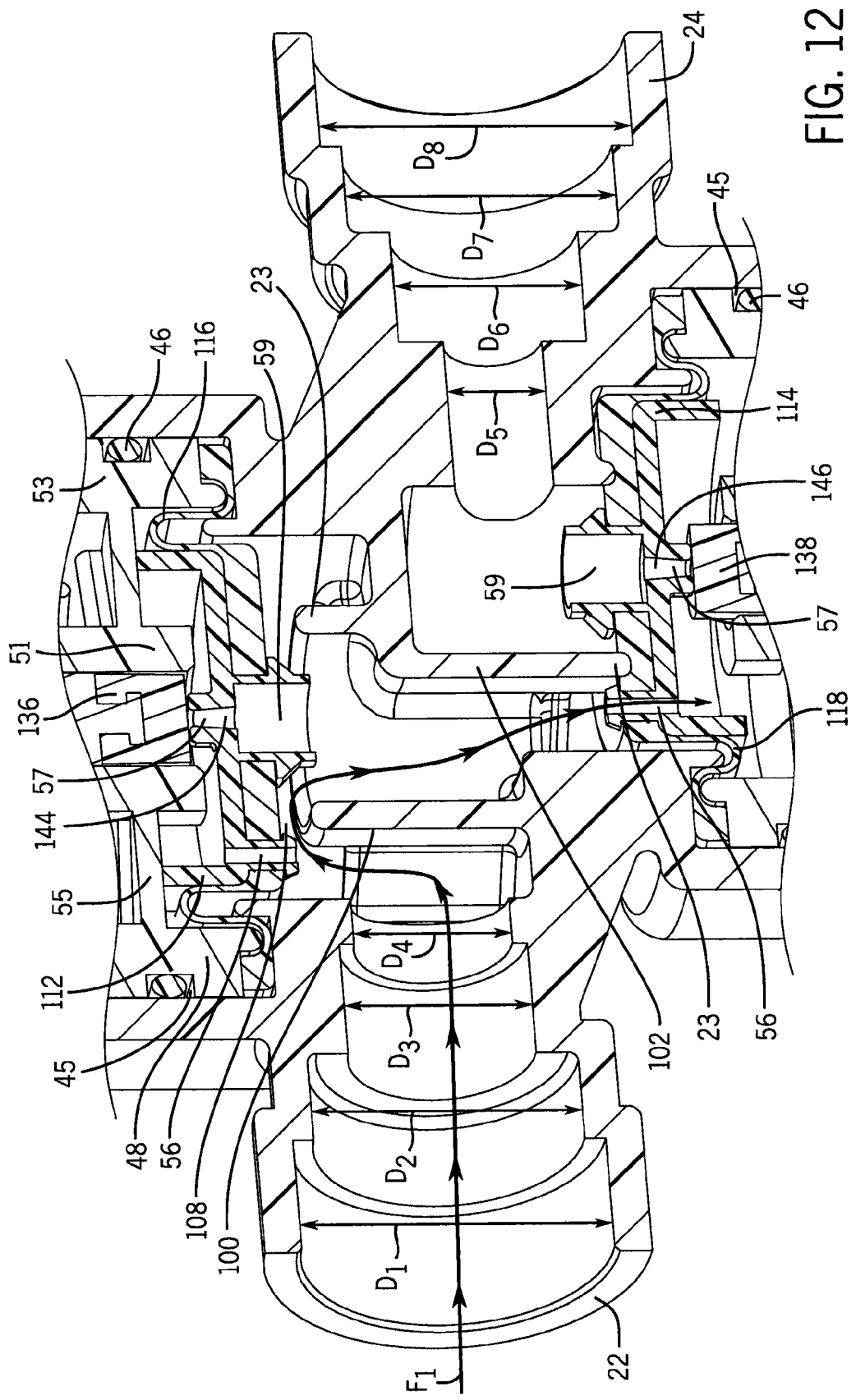
FIG. 12 is a partial cross-sectional view of the combination valve of FIG. 10 with the normally open valve in the open position and the normally closed valve in the closed position generally taken along the line 12-12 of FIG. 11.

As shown in FIG. 12, the valve body 14 also includes a first restriction wall 100 and a second restriction wall 102 positioned between the inlet 22 and the outlet 24. In one embodiment, the first restriction wall 100 extends upwardly from the valve body 14, and the second restriction wall 102 extends downwardly from the valve body 14. Both the first restriction wall 100 and the second restriction wall 102 terminate at a rounded top portion 23 to provide a fluid path for a service flow, as indicated by arrows representing flow path $F_1$. The service flow $F_1$ may be the flow of fluid provided to the inlet 22 of the combination valve 90 in the point of use filtration system 68, as shown in FIG. 15, for example.

Still referring to FIG. 12, the first restriction wall 100 and the second restriction wall 102 are provided to disrupt the linear flow of fluid through the valve body 14 and to direct fluid. To that end, the first restriction wall 100 and the second restriction wall 102 can be cylindrical in shape or any other suitable shape to restrict the service flow $F_1$. When the normally open valve portion 104 of the combination valve 90 is open, as shown in FIG. 12, the first restriction wall 100 can create a first opening 108 with the smallest diameter (e.g., $D_4$) coupled to the outlet 24. When the normally closed valve portion 106 of the combination valve 90 is open as shown in FIG. 13, the second restriction wall 102 can create a second opening 110 with the smallest diameter (e.g., $D_5$) coupled to the outlet 24.

Generally, the combination valve 90 begins operation with the normally open valve portion 104 in the open position and the normally closed valve portion 106 in the closed position, as shown in FIG. 12. Pressures (i.e., $P_3$ and $P_2$ shown in FIGS. 15 and 16) in the first control line 92 and the second control line 94 are below the pressure set point, allowing the system pressure to rise. Once the system or control line pressure $P_2$ and $P_3$ are greater than the pressure set point, the normally open valve portion 104 moves to a closed position, and the normally closed valve portion 106 moves to an open position, as shown in FIG. 13. Typically, the normally open valve portion 104 moves to the closed position before to the normally closed valve portion 106 moves to the open position to ensure the system pressure is not lost.

Figure 13:
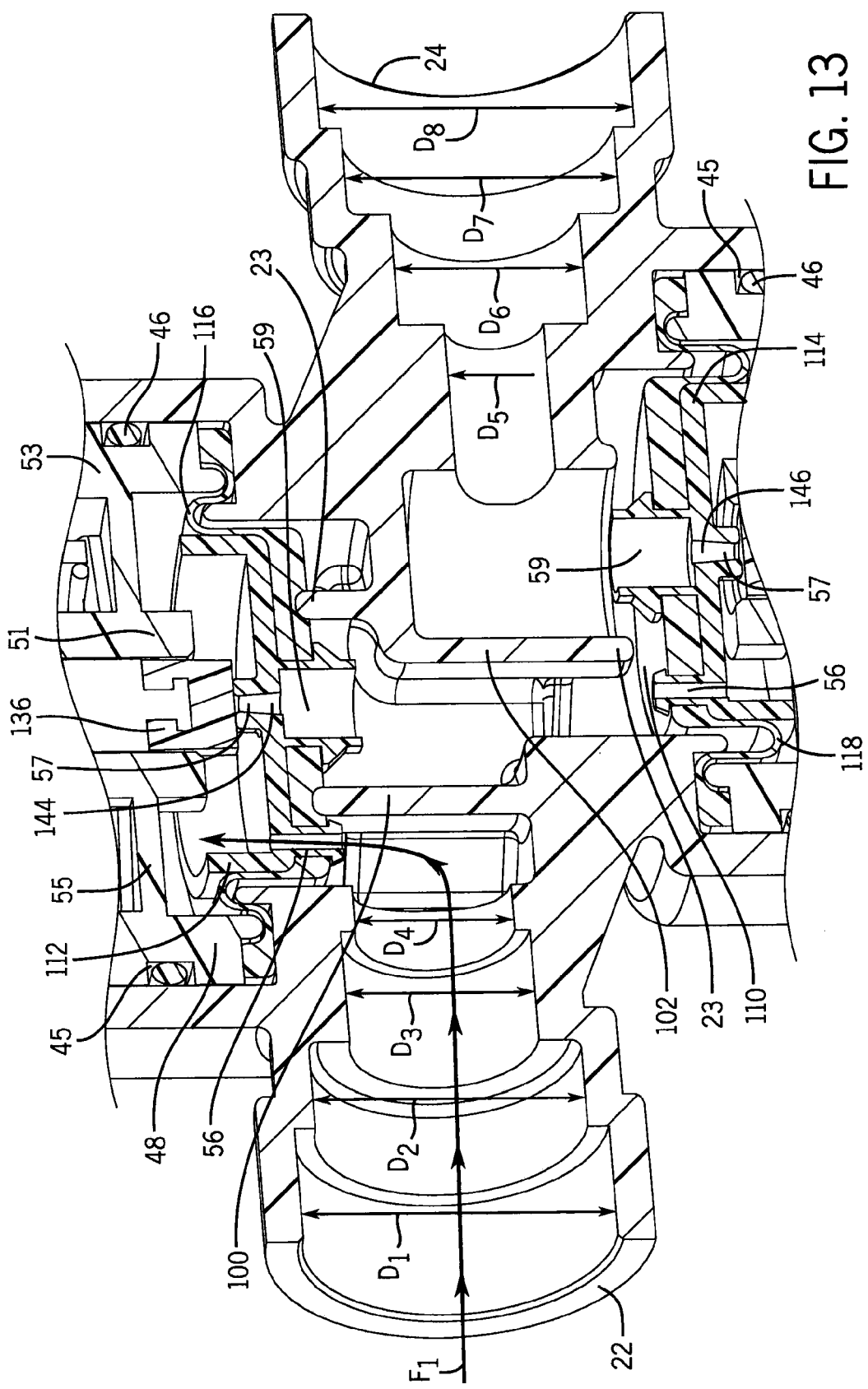
FIG. 13 is a partial cross-sectional view of the combination valve of FIG. 10 with the normally open valve in the closed position and the normally closed valve in the open position generally taken along the line 13-13 of FIG. 11.
Figure 14:
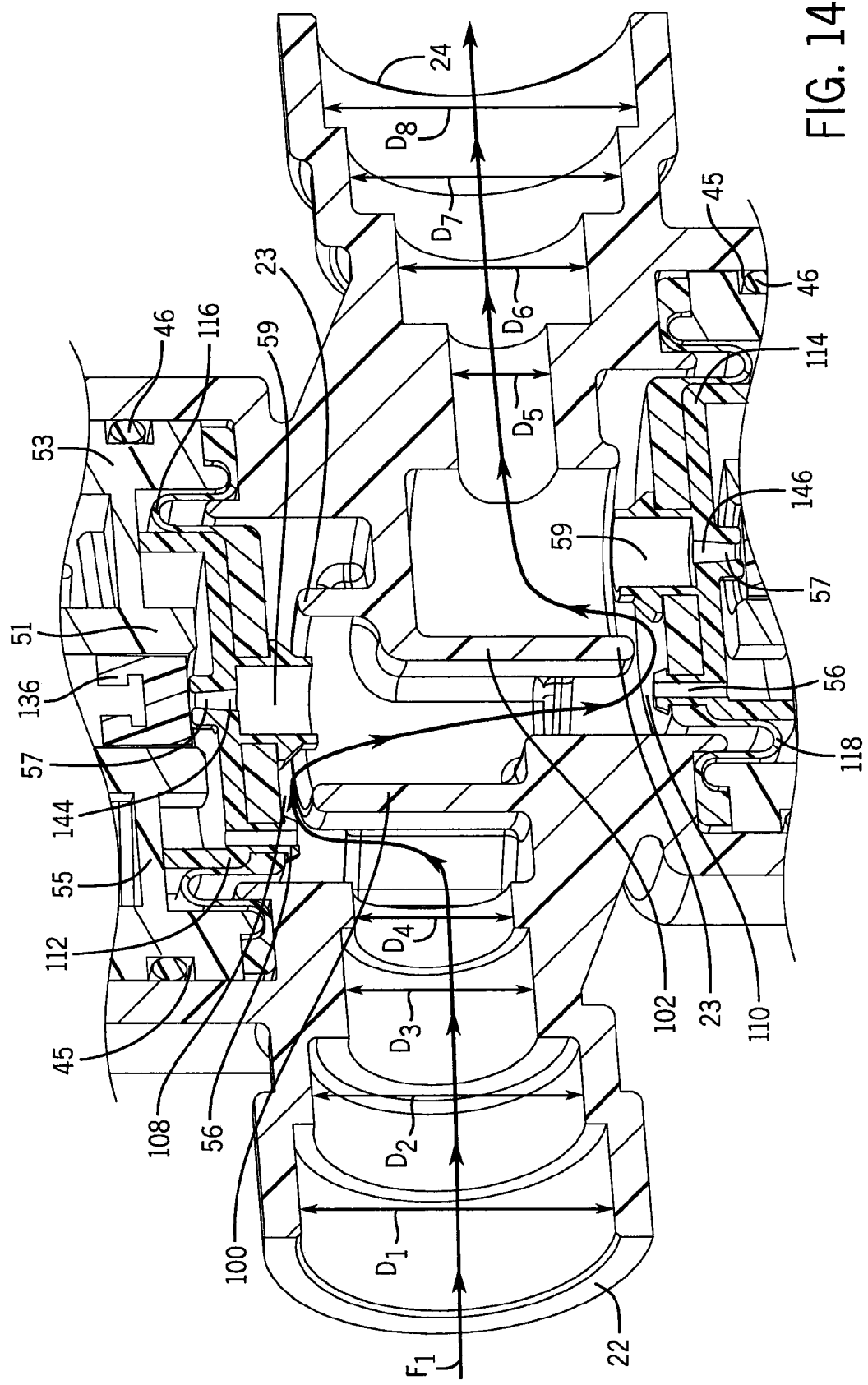
FIG. 14 is a partial cross-sectional view of the combination valve of FIG. 10 with the normally open valve in the open position and the normally closed valve in the open position generally taken along the line 14-14 of FIG. 11.

The normally open valve portion 104 will remain in the closed position and the normally closed valve portion 106 will remain in the open position, as shown in FIG. 13, until there is a pressure drop (e.g., due to opening a faucet 88 in the point of use filtration system 68 shown in FIG. 16) in the first control line 92 and the second control line 94. After the pressure drop in the first control line 92 and the second control line 94, the normally open valve portion 104 moves to the open position, and the normally closed valve portion 106 remains in the open position, as shown in FIG. 14. The normally closed valve portion 106 remains in the open position due to the location of the second control line 94 in the point of use filtration system 68, such that the pressure $P_2$ in the second control line 94 remains above the pressure set point. The $P_2$ pressure in the second control line 94 remains above the pressure set point even when the system is open to atmosphere due to a back pressure created by at least one of the ultrafiltration element 70 and a microfiltration element 74 in the point of use filtration system 68. Since the first control line 92 is coupled to the normally open valve portion 104 which is positioned nearest the atmosphere (e.g., closer to the faucet 88), the first control line 92 experiences a larger pressure drop, and therefore, the pressure $P_3$ in the first control line 92 drops below the pressure set point, causing the normally open valve portion 104 to move to the open position. More specifically, as shown in FIG. 12, the normally open valve portion 104 of the combination valve 90 begins operation in the open position. The normally open valve portion 104 can be controlled by the pressure set point. The first normally open spring 140 can be used to hold the normally open valve portion 104 in the open position, as long as the pressure at the first system pressure port 148 is below the pressure set point. With the normally open valve portion 104 in the open position, the service flow fluid $F_1$ can flow around the top portion 23 of the first restriction wall 100 between the inlet 22 and the outlet 24. Any excess service flow fluid can be vented through the bleed opening 56 and the first pilot 144.

At the same time, the normally closed valve portion 106 of the combination valve 90 begins operation in the closed position. The normally closed valve portion 106 can be controlled by the pressure set point. The second normally closed spring 142 can be used to hold the normally closed valve portion 106 in the closed position, as long as the pressure at the second system pressure port 150 is below the pressure set point, as shown in FIG. 12. With the normally closed valve portion 106 in the closed position, the service flow fluid $F_1$ is restricted from flowing through the inlet 22 to the outlet 24. Also, when the normally closed valve portion 106 is in the closed position, backflow of the service flow fluid $F_1$ is prevented.

The service flow fluid $F_1$ cannot flow between the inlet 22 and the outlet 24 until the pressure $P_3$ in the first control line 92 is below the pressure set point determined by the strength of the first normally open spring 140, and the pressure $P_2$ in the second control line 94 reaches the pressure set point, as determined by the strength of the second normally closed spring 142. Once the control pressure $P_2$ in the second control line 94 rises above the pressure set point, the middle chamber of the normally closed valve portion 106 can become pressurized and force the second upper piston 122, as best shown in FIG. 10, upwardly. The second upper piston 122 forced upwardly causes a pressure drop on a top side of the second lower diaphragm 118, and this pressure drop can then cause the pressure at the inlet 22 to force the second lower piston 114 upwardly, putting the normally closed valve portion 106 in the open position. The normally open valve portion 104 remains in the open position due to the system being manually opened (e.g., by the faucet 88 being opened) which causes a pressure drop in the first control line 92. Once the normally open valve portion 104 and the normally closed valve portion 106 are in open positions, the service flow fluid $F_1$ can flow between the inlet 22 and the outlet 24, as shown in FIG. 14.

Referring to FIG. 15, the flow of feed water F' in the point of use filtration system 68 during periods of stagnation or during a tank fill cycle is shown (e.g., the faucet 88 is closed). During the tank fill cycle, the normally closed valve portion 106 is closed due to the pressure $P_2$ in the second control line 94, and the normally open valve portion 104 is open due to the pressure $P_3$ in the first control line 92. Thus, the drain line 82 is closed allowing the system to rise in pressure. During the tank fill cycle, the faucet 88 is closed and the feed water F' enters the point of use filtration system 68 through the feed water line 80. As the feed water F' passes through the ultrafiltration element 70, permeate water fills and pressurizes the accumulator tank 72 downstream until the pressure in the accumulator tank 72 is equal to the pressure in the feed water line 80. Permeate water continues to flow, as indicated by arrows representing flow path C', past the accumulator tank 72 through the microfiltration element 74 thereby providing pressure to the first control line 92 and the second control line 94. However, the pressure $P_2$ in the second control line 94 does not initially reach the pressure set point, which causes the normally closed valve portion 106 to remain closed at the drain line 82 due to a first control switch 76 not being activated. Once the overall system pressure rises above the pressure set point, the pressure $P_3$ in the first control line 92 reaches the pressure set point, a second control switch 75 is activated and the normally open valve portion 104 closes at the drain line 82. The pressure $P_2$ in the second control line 94 also reaches the pressure set point, the first control switch 76 is activated and the normally closed valve portion 106 opens at the drain line 82. In one embodiment, the normally open valve portion 104 closes prior to the normally closed valve portion 106 opening to ensure they system does not lose pressure (i.e., the drain line 82 remains closed). The above described tank fill cycle runs until pressure is equalized. Namely, the pressure in the accumulator tank 72 is equal to the pressure in the feed water line 80. In one embodiment, the equalized pressure may be about 248 kPa. In another embodiment, the equalized pressure is 248 kPa.

Referring to FIG. 16, which illustrates the flow of feed water during the service, or in use, cycle of the point of use filtration system 68. The service cycle can begin whenever the user opens the faucet 88. The first pressure drop in the second control line 94 is less than the second pressure drop because of the backpressure provided by the ultrafiltration element 70 and/or the microfiltration element 74, which causes the normally closed valve portion 106 at the drain 86 to remain open in absence of power. Thus, the first pressure drop in the second control line 94 causes the pressure $P_2$ to remain above the pressure set point. The pressure drop in the first control line 92 causes the normally open valve portion 104 at the drain 86 to open, such that the second pressure drop in the first control line 92 causes the pressure $P_3$ to fall below the pressure set point. The actuation of the valve portions 104 and 106 will substantially, immediately, and/or automatically cause a portion of the accumulated pressurized water in the accumulator tank 72 to flow upstream to mechanically put the ultrafiltration element 70 into a backwash cycle, as indicated by arrows representing flow path B'.

Any concentrate remaining from the backwash cycle can exit the point of use filtration system 68 through the drain line 82 and the normally open valve portion 104 and the normally closed valve portion 106 to the drain 86. Another portion of accumulated pressurized water in the accumulator tank 72 will flow downstream to provide service water, as indicated by arrows representing flow path S', that will pass through the microfiltration element 74 before exiting through the permeate line 78 and the faucet 88.

The service flow fluid $F_1$ can continue to flow between the inlet 22 and the outlet 24 of the combination valve 90 until the system is manually closed (e.g., by the faucet 88 being closed). The first control line 92 then reaches the pressure set point, as determined by the strength of the first normally open spring 140, allowing the upper chamber of the normally open valve portion 104 to become pressurized. Once the upper chamber of the normally open valve portion 104 becomes pressurized above the pressure set point, the first upper piston 120, as best shown in FIG. 10, will be forced downwardly, compressing the first normally open spring 140. Simultaneously, the first plunger 136 puts pressure on the first lower piston 112 and the first lower diaphragm 116 to partially or fully obstruct the first pilot 144. With the first plunger 136 partially or fully obstructing the first pilot 144, pressure builds up on a top side of the first lower diaphragm 116, which with the assistance of the first upper piston 120 force, closes the normally open valve portion 104, as shown in FIG. 13. The service flow fluid $F_1$, cannot flow through the outlet 24 when the normally open valve portion 104 is in the closed position. Further, the service flow fluid $F_1$ cannot flow in the opposite direction (e.g., out through the inlet 22) when the normally oven valve portion 104 is in the closed position as shown in FIG. 13.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A valve that is normally open, the valve adapted to be coupled to a fluid supply line, the valve providing a service flow of fluid, the valve receiving a control fluid, the valve in fluid communication with atmosphere, the valve comprising:
   a valve body including an inlet coupled to the fluid supply line and an outlet providing the service flow of fluid;
   a restriction wall positioned between the inlet and the outlet, the restriction wall defining a passageway for the service flow of fluid; and a chamber within the valve body within which is:
  a sealing mechanism configured to selectively block the passageway for the service flow of fluid;
  an upper diaphragm positioned at a second end of the chamber opposite the first end of the chamber; and
  a mechanical valve actuator having an inner bore and configured to translate separately from the sealing mechanism and positioned between the sealing mechanism and the upper diaphragm,
  wherein a spring is positioned within the inner bore of the mechanical valve actuator and is configured to engage the mechanical valve actuator in order to open the valve.

2. The valve of claim 1, wherein the sealing mechanism includes a lower piston and a lower diaphragm, and the valve body includes a bleed opening extending through the lower piston and the lower diaphragm and configured to vent fluid flow at the inlet, the bleed opening venting excess service flow to a lower chamber when the valve is closed.

3. The valve of claim 1, wherein the valve body includes an upper chamber, a middle chamber, and a lower chamber, the upper chamber positioned between the upper diaphragm and the system pressure port, and the lower chamber positioned between the middle chamber and the sealing mechanism.

4. The valve of claim 3, wherein the control fluid provided to the valve through the system pressure port is confined to the upper chamber and maintained separate from the service flow of fluid between the inlet and the outlet.

5. The valve of claim 1, wherein the mechanical valve actuator includes a plunger and the sealing mechanism includes a pilot, such that the plunger is configured to cover the pilot to prohibit backflow of the service flow of fluid when the valve is closed.

6. The valve of claim 1, wherein the pilot includes a first passageway with a first diameter extending through the lower piston, and a second passageway with a second diameter extending through the lower diaphragm, the first diameter being smaller than the second diameter.

7. The valve of claim 1, further comprising a vent venting to the atmosphere, wherein at least one of the inlet, the outlet, the vent, and the system pressure port include a passageway with a plurality of radially concentric diameters.

8. The valve of claim 1, wherein the pressure set point is determined by a strength parameter of the spring.

9. The valve of claim 1, wherein the pressure set point is 69 kPa.

10. The valve of claim 1, wherein the control fluid enters the system pressure port to actuate the valve without the use of electrical power.

11. A valve that is normally closed, the valve adapted to be coupled to a fluid supply line, the valve providing a service flow of fluid, the valve receiving a control fluid, the valve in fluid communication with atmosphere, the valve comprising:
  a valve body including an inlet coupled to the fluid supply line;
  an outlet providing the service flow of fluid;
  a restriction wall positioned between the inlet and the outlet, the restriction wall defining a passageway for the service flow of fluid; and
  a chamber within the valve body and including:
    a sealing mechanism designed to selectively close the passageway for the service flow, positioned in a first end of the chamber;
    an upper diaphragm positioned in a second end of the chamber opposite the first end of the chamber;
    a mechanical valve actuator having an inner bore and configured to translate within the valve body separately from the sealing mechanism and positioned between the sealing mechanism and the upper diaphragm; and
    a spring disposed within the inner bore of the mechanical valve actuator that engages the mechanical valve actuator in order to close the valve.

12. The valve of claim 11, wherein the mechanical valve actuator includes a plunger and the sealing mechanism includes a pilot hole, such that the plunger is configured to cover the pilot hole and prohibit backflow of the service flow of fluid when the valve is closed.

13. The valve of claim 11, wherein the spring is a compression spring.

14. The valve of claim 11, wherein the control fluid enters the system pressure port to actuate the valve without the use of electrical power.

15. A valve adapted to be coupled to a fluid supply line, the valve providing a service flow of fluid, the valve receiving a control fluid, the valve in fluid communication with atmosphere, the valve comprising:
  a valve body including an inlet coupled to the fluid supply line;
  an outlet providing the service flow of fluid;
  a restriction wall positioned between the inlet and the outlet, the restriction wall defining a passageway for the service flow of fluid; and
  a chamber within the valve body and including therein:
    a sealing mechanism designed to selectively close the passageway for the service flow and positioned in a first end of the chamber;
    an upper diaphragm positioned in a second end of the chamber opposite the first end of the chamber;
    a mechanical valve actuator configured to translate within the valve body separately from the sealing mechanism; and
    a spring engaging the mechanical valve actuator in order to close the valve, the spring being disposed within an inner bore of the mechanical valve actuator and coaxially disposed therewith.

16. The valve of claim 15, wherein the sealing mechanism includes a lower piston and a lower diaphragm, and the valve body includes a bleed opening extending through the lower piston and the lower diaphragm and configured to vent fluid flow at the inlet, the bleed opening venting excess service flow to a lower chamber when the valve is closed.

17. The valve of claim 15, wherein the valve body includes an upper chamber, a middle chamber, and a lower chamber, the upper chamber positioned between the upper diaphragm and a system pressure port that is coupled to the valve body, and the lower chamber positioned between the middle chamber and the sealing mechanism.

18. The valve of claim 17, wherein the control fluid provided to the valve through the system pressure port is confined to the upper chamber and maintained separate from the service flow of fluid between the inlet and the outlet.

19. The valve of claim 15, wherein the mechanical valve actuator includes a plunger and the sealing mechanism includes a pilot, such that the plunger is configured to cover the pilot to prohibit backflow of the service flow of fluid when the valve is closed.

20. The valve of claim 15, wherein the sealing mechanism includes a lower piston, a lower diaphragm, and a pilot extending through the lower piston and the lower diaphragm, the pilot including a first passageway with a first diameter extending through the lower piston, and a second passageway with a second diameter extending through the lower diaphragm, the first diameter being smaller than the second diameter.

* * * * *